US011800829B2

United States Patent
Sidon et al.

(10) Patent No.: US 11,800,829 B2
(45) Date of Patent: Oct. 31, 2023

(54) WORK MACHINE ZONE GENERATION AND CONTROL SYSTEM WITH GEOSPATIAL CONSTRAINTS

(71) Applicant: Deere & Company, Moline, IL (US)

(72) Inventors: Jeffrey S. Sidon, Des Moines, IA (US); Sam R. Helmich, Des Moines, IA (US); Scott W. Anderson, Johnston, IA (US); David J. Glass, West Des Moines, IA (US)

(73) Assignee: Deere & Company, Moline, IL (US)

( * ) Notice: Subject to any disclaimer, the term of this patent is extended or adjusted under 35 U.S.C. 154(b) by 743 days.

(21) Appl. No.: 16/780,338

(22) Filed: Feb. 3, 2020

(65) Prior Publication Data

US 2021/0176916 A1 Jun. 17, 2021

Related U.S. Application Data

(60) Provisional application No. 62/949,072, filed on Dec. 17, 2019.

(51) Int. Cl.
| | |
|---|---|
| *A01B 79/00* | (2006.01) |
| *A01D 41/127* | (2006.01) |
| *G06V 20/10* | (2022.01) |
| *G06F 18/2321* | (2023.01) |
| *E02F 9/26* | (2006.01) |

(52) U.S. Cl.
CPC .......... *A01B 79/005* (2013.01); *A01D 41/127* (2013.01); *G06F 18/2321* (2023.01); *G06V 20/188* (2022.01); *E02F 9/262* (2013.01)

(58) Field of Classification Search
None
See application file for complete search history.

(56) References Cited

U.S. PATENT DOCUMENTS

| | | |
|---|---|---|
| 10,091,925 B2 | 10/2018 | Aharoni et al. |
| 10,255,670 B1 | 4/2019 | Wu et al. |
| 10,408,645 B2 | 9/2019 | Blank et al. |

(Continued)

FOREIGN PATENT DOCUMENTS

WO WO2007050192 A2 5/2007

OTHER PUBLICATIONS

Crop Quest, Management Zones, Apr. 10, 2019 (Year: 2019).*

(Continued)

*Primary Examiner* — Christian Chace
*Assistant Examiner* — Scott R Jagolinzer
(74) *Attorney, Agent, or Firm* — Christopher J. Volkmann; Kelly, Holt & Christenson, PLLC

(57) ABSTRACT

A work machine includes a work machine actuator, a position sensor configured to sense a geographic position of the work machine on a worksite and a control system configured to receive an indication of a thematic map of the worksite that maps variable values to different geographic locations on the worksite, generate a set of clusters based on the variable values and a geospatial control zone constraint, identify, based on the set of clusters, a plurality of control zones that are correlated to the worksite and have associated setting values, and generate control signals to control the work machine actuator based on the geographic position of the work machine relative to the plurality of control zones and the setting values associated with the control zones.

18 Claims, 18 Drawing Sheets

(56) References Cited

U.S. PATENT DOCUMENTS

| | | | |
|---|---|---|---|
| 11,080,798 B2* | 8/2021 | Ethington | G06Q 10/04 |
| 2014/0215984 A1* | 8/2014 | Bischoff | A01D 41/127 |
| | | | 56/10.2 R |
| 2016/0239709 A1* | 8/2016 | Shriver | G06V 20/188 |
| 2018/0132422 A1 | 5/2018 | Hassanzadeh et al. | |
| 2018/0257657 A1 | 9/2018 | Blank et al. | |
| 2019/0069470 A1 | 3/2019 | Pfeiffer et al. | |
| 2020/0326727 A1 | 10/2020 | Palla et al. | |

OTHER PUBLICATIONS

Extended European Search Report and Written Opinion issued in European Patent Application No. 20208171.7, dated May 11, 2021, in 05 pages.

Córdoba, M.A., Bruno, C.I., Costa, J.L., Peralta, N.R. and Balzarini, M.G., 2016. Protocol for multivariate homogeneous zone delineation in precision agriculture, biosystems engineering, 143, pp. 95-107.

"Fuzzy Clustering", <<https://en.wikipedia.org/wiki/Fuzzy_clustering>>, accessed on Oct. 4, 2022 via Wayback machine <<http://web.archive.org/web/20190430214450/https://en.wikipedia.org/wiki/Fuzzy_clustering>>, archive date: Apr. 30, 2019, 7 pages.

"Fuzzy K-Means", <<http://wdm0006.github.io/sklearn-extensions/fuzzy_k_means.html>>, accessed on Oct. 4, 2022 via Wayback machine <<https://web.archive.org/web/20191120235410/http://wdm0006.github.io/sklearn-extensions/fuzzy_k_means.html>>, archive date: Nov. 20, 2019, 3 pages.

* cited by examiner

WORK MACHINE ZONE GENERATION AND CONTROL SYSTEM WITH GEOSPATIAL CONSTRAINTS

CROSS-REFERENCE TO RELATED APPLICATION

The present application is based on and claims the benefit of U.S. provisional patent application Ser. No. 62/949,072, filed Dec. 17, 2019, the content of which is hereby incorporated by reference in its entirety.

FIELD OF THE DESCRIPTION

The present description generally relates to controlling a work machine. More specifically, but not by limitation, the present description generally relates to controlling actuators (or other controllable systems or devices) of a work machine based on control zones utilizing geospatial constraints.

BACKGROUND

There are a wide variety of different types of work machines. They include machines such as construction machines, turf management machines, forestry machines, agricultural machines, etc. In some current systems, a priori data is collected and used to generate a predictive map that predicts one or more different variables, that may be relevant to controlling the work machine, for a particular worksite. The map maps the variables to different geographic locations on the worksite. The maps are then used in an attempt to control the machine as it travels about the worksite performing an operation.

One particular example is in controlling an agricultural harvester. Some current systems attempt to collect a priori data (such as aerial imagery) and generate a predictive yield map from the a priori data. The predictive yield map maps predicted yield values, in a field being harvested, to geographic locations in that field. The systems attempt to control the work machine based upon the predictive yield map, as it travels through the field being harvested.

The discussion above is merely provided for general background information and is not intended to be used as an aid in determining the scope of the claimed subject matter.

SUMMARY

A work machine includes a work machine actuator, a position sensor configured to sense a geographic position of the work machine on a worksite and a control system configured to receive an indication of a thematic map of the worksite that maps variable values to different geographic locations on the worksite, generate a set of clusters based on the variable values and a geospatial control zone constraint, identify, based on the set of clusters, a plurality of control zones that are correlated to the worksite and have associated setting values, and generate control signals to control the work machine actuator based on the geographic position of the work machine relative to the plurality of control zones and the setting values associated with the control zones.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to controlling a work machine. More specifically, but not by limitation, the present description generally relates to controlling actuators (or other controllable systems or devices) of a work machine based on control zones utilizing geospatial constraints.

Figure 1:
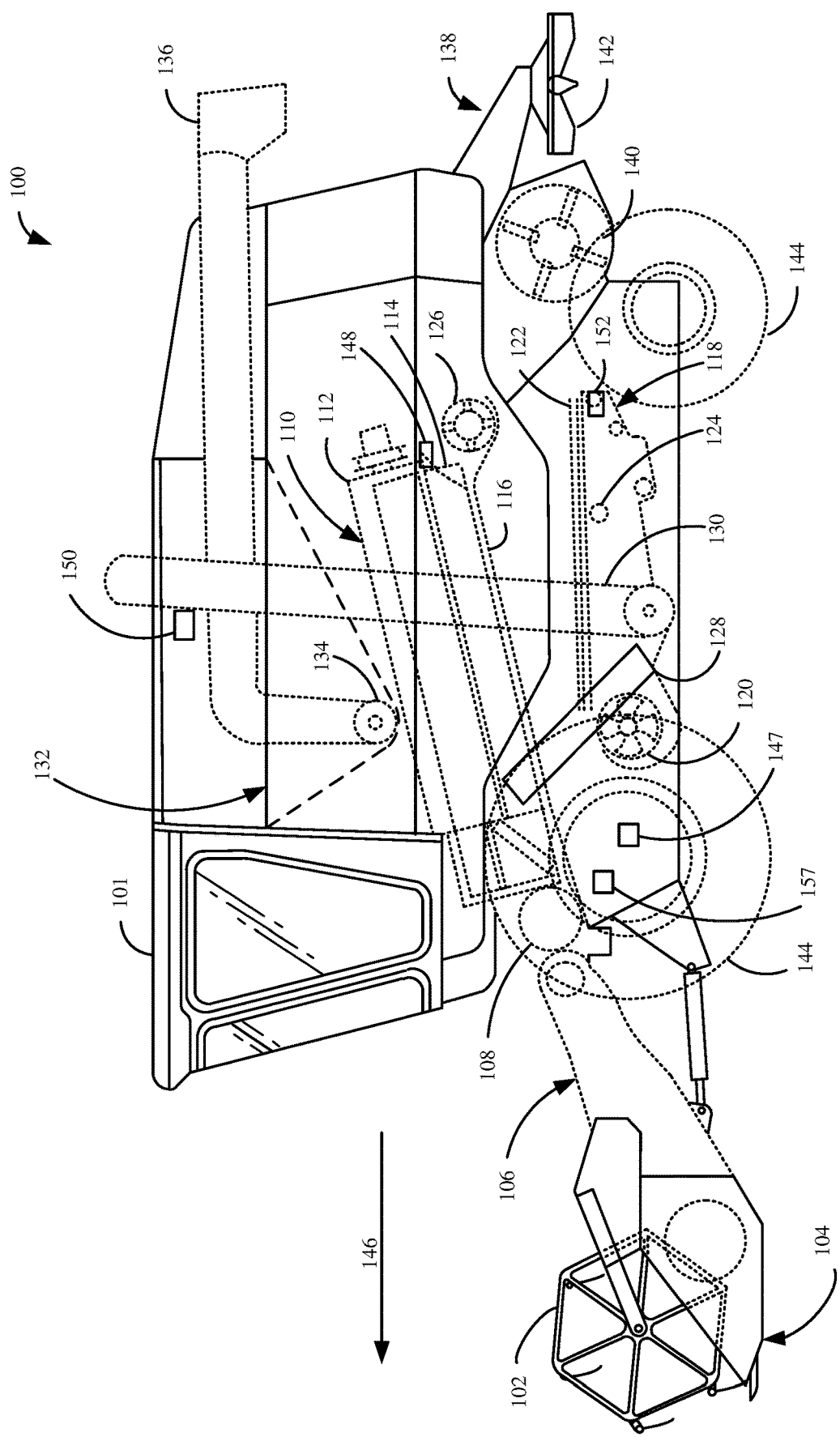
FIG. 1 is a partial pictorial, partial block diagram of one example of a work machine.

FIG. 1 is a partial pictorial, partial block diagram of one example of a work machine 100. Work machine 100 illustratively comprises an agricultural combine harvester (also referred to as combine or harvester 100). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152, and position sensor 157. Ground speed sensor 147 illustratively senses the travel speed of combine 100 over the ground. This can be done by sensing the speed of rotation of the wheels, the drive shaft, the axel, or other components. The travel speed and position of combine 100 can also be sensed by positioning sensor 157, such as a global positioning system (GPS), a dead reckoning system, a LORAN system, a cellular triangulation system, or a wide variety of other systems or sensors that provide an indication of travel speed and/or position.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation or pose of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

Figure 2:
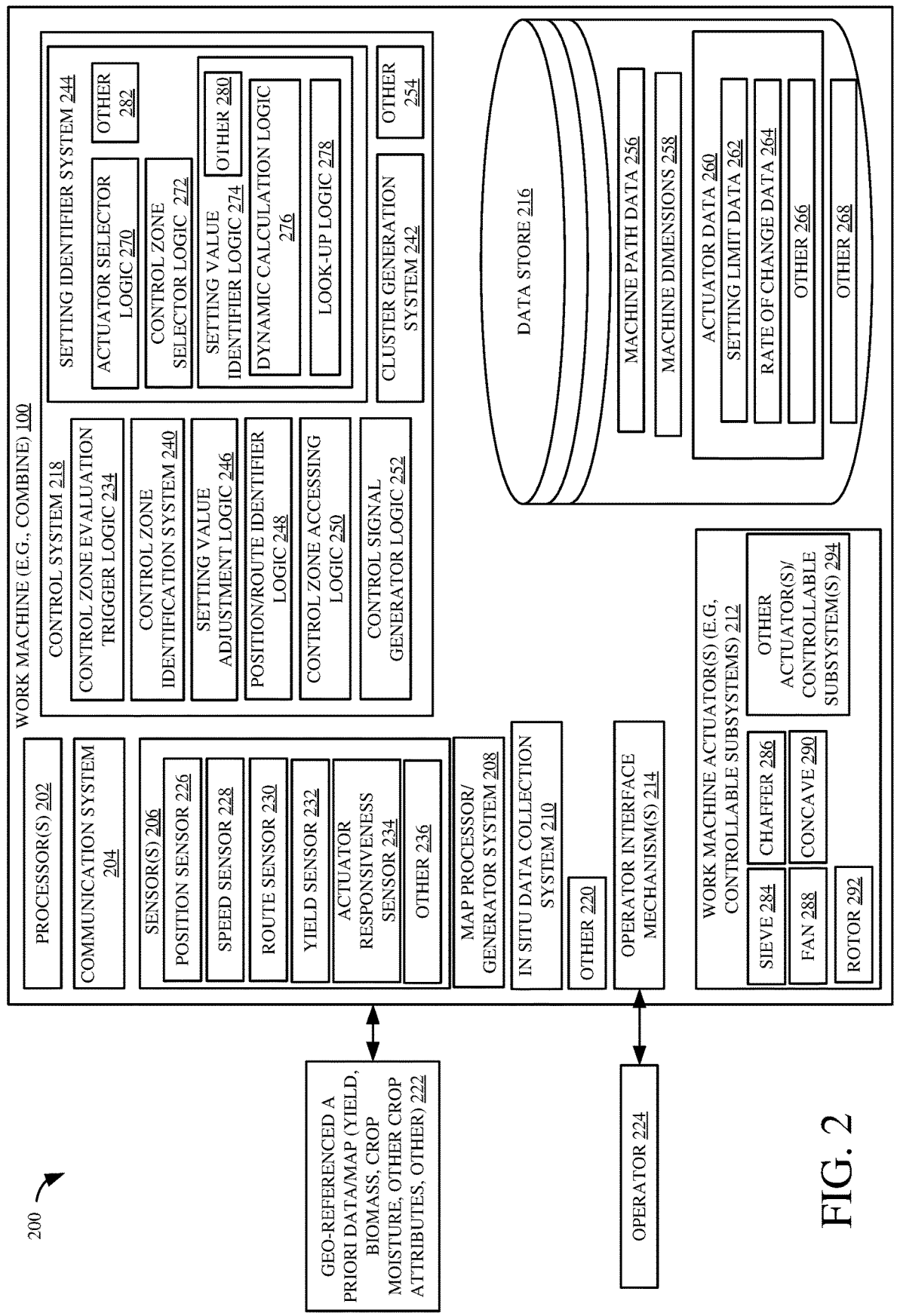
FIG. 2 is a block diagram of an example work machine architecture including the work machine shown in FIG. 1, with portions illustrated in more detail.

FIG. 2 is a block diagram of an example work machine architecture 200 including work machine 100 shown in FIG. 1, with portions illustrated in more detail. Thus, FIG. 2 shows that work machine 100 can include one or more processors 202, communication system 204, sensors 206 (which can be the same and/or different sensors from those described above with respect to FIG. 1), map processor/generator system 208, in situ data collection system 210, work machine actuator(s) (e.g., controllable subsystem(s)) 212, operator interface mechanism(s) 214, data store 216, control system 218, and it can include a wide variety of other items 220 as well.

The example in FIG. 2 also shows that work machine 100 can illustratively receive geo-referenced a priori data or map 222. The a priori data or map 222 can include geo-referenced yield data, biomass data, crop moisture data, other crop attribute data, or a wide variety of other geo-referenced a priori data. In one example, the geo-referenced a priori data or map 222 can be received from a remote server environment or from another remote system over a network. Thus, the network may include a wide area network, a local area network, a near field communication network, a cellular communication network, or any of a wide variety of other networks or combinations of networks.

The example in FIG. 2 also shows that operator 224 interacts with operator interface mechanism(s) 214 in order to control and manipulate work machine 100. Thus, operator interface mechanism(s) 214 can include a steering wheel, joysticks, levers, pedals, buttons and switches, actuatable inputs on a user interface display which can be actuated by a point and click device (or, where the display is a touch sensitive display, they can be actuated by touch gestures), speech recognition functionality so that the operator 224 can provide an input through a microphone and receive speech synthesis outputs through a speaker, or a wide variety of other audio, visual, or haptic interface mechanisms.

Before describing the operation of work machine 100, in generating control zones and controlling actuator(s) 212 using those control zones, a brief description of some of the items illustrated in FIG. 2, and their operation, will first be described.

Communication system 204 is illustratively configured to allow items in work machine 100 to communicate with one another, and to communicate with other items, such as remote computing systems, hand held devices used by operator 224, or other items. Depending on the items that work machine 100 is communicating with, communication system 204 enables that type of communication.

Sensor(s) 206 can include position sensor 226 (e.g., position sensor 157), speed sensor 228 (e.g., speed sensor 147), route sensor 230, yield sensor 232, actuator responsiveness sensor 234, and it can include other items 236. As discussed above, position sensor 226 may be a GPS receiver, or any of a wide variety of other sensors that generate an output indicative of a geographic location of work machine 100. Speed sensor 228 generates an output indicative of the ground speed of work machine 100. Route sensor 230 can sense a heading, orientation, or pose of work machine 100 so that, when combined with the speed of work machine 100, and its current geographic position, it can identify a historic, and extrapolate a future, route that work machine is traveling. Route sensor 230 can identify the route of work machine 100 in other ways as well.

Yield sensor 232 illustratively generates an output indicative of a current yield being encountered by work machine 100. As discussed above, the yield sensor 232 can be a mass flow sensor that senses a mass flow of grain into the clean grain tank of machine 100. That can be correlated to a geographic position of machine 100 where that grain was harvested, in order to identify an actual yield, over different geographic locations in the field being harvested.

Actuator responsiveness sensor 234 can illustratively generate an output indicative of the responsiveness of the work machine actuators 212. By way of example, under certain wear conditions, or under different environmental conditions, the actuators may react more quickly or more slowly. By way of example, when a work machine 100 is beginning an operation, and the weather is relatively cold, some hydraulic actuators may respond more slowly than when the work machine is performing the same operation in relatively warm weather. Similarly, after the different actuators undergo a great deal of wear, they may respond differently. These are just some example of how the responsiveness of the different work machine actuators 212 may change over time, or under different conditions.

Map processor/generator system 208 illustratively processes the geo-referenced a priori data 222 that is received. When it is received in the form of a map, that maps variable values to different geographic locations on the field, system 208 illustratively parses that map to identify the values and the corresponding geographic locations. Where the data is raw geo-referenced data, it parses that data as well in order to obtain the same types of values. Similarly, where it receives multiple different maps reflecting multiple different attributes, it processes each of those maps, or each of those sets of a priori data, to obtain the variable values and their corresponding geographic locations.

In situ data collection system 210, in one example, monitors and collects data generated by sensor(s) 206. It can include aggregation logic that aggregates the data collected from those sensors, data measure logic that measures the data collected from those sensors, and it can include other items as well.

Control system 218 includes control zone evaluation trigger logic 238, control zone identification system 240, a cluster generation system 242, a setting identifier system 244, setting value adjustment logic 246, position/route identifier logic 248, control zone accessing logic 250, control signal generator logic 252, and it can include other items 254.

Logic 238 detects any of a variety of different types of triggers that can be used to generate or modify the control zones and settings values. In one example, logic 238 can be configured to initiate a control zone and setting evaluation process intermittently, or at a particular time that is based on the operation to be performed by machine 100. For instance, logic 238 can trigger the evaluation of control zones before machine 100 is at the worksite (i.e., field), before machine 100 initiates the operation at the field, during operation of machine 100 at the worksite, or otherwise.

Data store 216 illustratively includes machine path data 256, machine dimensions 258, actuator data 260 (which, itself, can include setting limit data 262, rate of change data 264, as well as other items 266), and other data items 268. For instance, the machine path data 256 can identify the traversal path of machine 100 across the worksite. Machine dimensions 258 can indicate a width of machine 100. For instance, in the case of the combine harvester illustrated in FIG. 1, machine dimensions 258 can indicate the width of header 102. The machine path data 256 and/or machine dimensions 258 can be utilized by control system 218 in generating control zones that are used to control work machine actuator(s) 212 of machine 100.

Similarly, each of the work machine actuator(s) 212 may have a particular setting limit and/or rate of change limit. The setting limit may indicate the opposite extreme ends of actuation of the corresponding actuator, while the rate of change limit may indicate how quickly a given actuator can respond to an actuation input, under different circumstances (such as under different temperature conditions, wear conditions, etc.). The setting limits and responsiveness can be sensed as well, as discussed above with respect to sensor 234.

Control zone identification system 240 is configured to identify control zones based on clusters generated by cluster generation system 242 from points define in data or map 222. Examples of cluster generation system 242 are discussed in further detail below. Briefly, however, system 242 generates clusters using any suitable clustering algorithms such, but not limited to, k-means clustering, fuzzy C-means clustering, to name a few. Based on these clusters, control zones are identified by system 240. In one example, a single control zone is identified for the entire machine 100 for a given target path or swath over the field. For instance, the control zone spans the entire width of the header 102 in the case of combine 100. In another example, control zones can be generated on a per-subsystem or per-work machine actuator basis. That is, each controllable subsystem can have its own set of control zones that are not necessarily related to the control zones for other controllable subsystems. The control zones can be specific to subsets of controllable subsystems, or subsets of controllable work machine actuators, or they can be generated for individual, controllable subsystems or individual work machine actuators, and can be specifically tailored to those subsystems or actuators. In this case, system 240 can include actuator selector logic that selects one of work machine actuator(s) 212 for which control zones are to be identified or dynamically updated or modified. For instance, it may be that system 240 selects one of the actuators 212 and identifies the control zones for that actuator. When finished, the selector logic selects a next work machine actuator for which control zones are to be identified.

Setting identifier system 244 illustratively includes work machine actuator selector logic 270, control zone selector logic 272, and setting value identifier logic 274 (which, itself, can include dynamic calculation logic 276, lookup logic 278, and/or a wide variety of other items 280). Setting identifier system 244 can include other items 282. Actuator selector logic 270 selects one or more actuator(s) for which control zone settings values are to be generated. Control zone selector logic 272 then identifies one or more different control zones that were identified by system 240, for which settings values are to be generated for the particular work machine actuator. Setting value identifier logic 274 then identifies the settings values for that particular control zone, for the selected work machine actuator(s). Therefore, when machine 100 is about to enter the corresponding control zones, the corresponding actuator is set to the identified settings values for that control zone, for that actuator.

In identifying the particular settings values for a control zone, dynamic calculation logic 276 can dynamically calculate a settings value based upon the geo-referenced a priori data provided by map processor/generator system 208 and/or based upon in situ data collected by system 210. For instance, it may be that the predicted yield value in the geo-referenced a priori data or map 222 may need to be adjusted based upon the actual yield data that has been collected by the in situ sensors. In that case, dynamic calculation logic 276 can generate or modify the settings values for a set of control zones based upon the predicted value, from the a priori data, as corrected by the actual value, generated by the in situ sensors.

Lookup logic 278 can illustratively identify settings values for different control zones, for different work machine actuators, by performing a lookup operation. For instance, it may be that the a priori predicted yield data, as corrected by the in situ data, is stored in a lookup table indexed by geographic location. Based upon the geographic location of the control zones identified by the system 240, lookup logic 278 can look up settings values, for that control zone, at that geographic location, for the specific work machine actuator(s) being controlled based on that control zone. The settings values can of course be identified in other ways as well.

Once the control zones have been identified (or updated) and the settings values for each of the control zones have been generated (or updated) this information is provided to control system 218. Control system 218 then generates control signals to control work machine actuators 212, based upon that data.

Position/route identifier logic 248 identifies a current position of work machine 100, and a geographic position that will be occupied by work machine 100 in the near future. For instance, it can identify a current position of work machine 100 based upon the output of position sensor 226 and it can identify a next geographic position of work machine 100 based upon the route sensed by route sensor 230 and the speed output by speed sensors 228.

Zone accessing logic 250 then identifies the control zone (or different control zones for different actuators) that work machine 100 is in, and/or is about to enter. Setting value adjustment identifier logic 246 identifies that adjustments will need to be made (such as its direction and magnitude) and control signal generator logic 252 generates control signals to control the work machine actuator(s) 212 accordingly.

For instance, if work machine 100 is nearing the boundary of two control zones, and the magnitude of the adjustment is relatively large, as indicated by logic 250, control signal generator logic 252 can begin to actuate the actuator so that it reaches its new setting value (for the subsequent control zone that machine 100 is approaching) at the time, or shortly after the time, when work machine 100 enters that control zone. Thus, given the responsiveness of the actuator and the magnitude of the change in the setting values from the current control zone to the next control zone, control signal generator logic 252 identifies a geographic location where it will need to actuate the actuator to make the settings adjustment to correspond with the control zone boundary crossing.

Work machine actuator(s) 212 can include a sieve actuator 284, a chaffer actuator 286, a fan actuator 288, a concave actuator 290, a rotor actuator 292, and it can include a wide variety of other actuators or controllable subsystems 294, such as an engine, drivetrain actuator, feed rate adjustment actuator, header height actuator, etc. The sieve actuator 284 can illustratively be actuated in order to change the sieve settings. Chaffer actuator 286 may be an actuator that can be actuated to change the chaffer settings. The fan actuator 288 may be actuated to change the fan speed of the cleaning fan or other fans in work machine 100. Concave actuator 290 can be actuated to change the concave clearance. Rotor actuator 292 can be actuated to change the rotor speed or other operational parameters. Therefore, as work machine 100 travels across the field, it may enter different control zones that each have settings values for different work machine actuator(s) 212. The control zones for one work machine actuator 212 may not necessarily correspond to the control zones for another actuator. Therefore, independent, actuator-specific control zones can be generated and settings values can be set for each of those control zones so that control system 218 can, substantially simultaneously, control all of the work machine actuator(s) 212 based upon their individual control zones and individual setting values.

As discussed above, some systems to use a thematic map (such as a yield map) created from a priori data (such as aerial imagery data or historical data) in order to control a work machine, such as a harvester. However, this can present a number of difficulties. For instance, some systems attempt to control the work machine based upon instantaneous values of the variables reflected in the thematic map (e.g., based upon the instantaneous yield values, given the location of the harvester in the field). However, it may be that the actuators on the work machine are not responsive enough to adjust quickly enough to the instantaneous changes in those values. Also, different actuators may react differently to different variables. Thus, attempting to control the work machine based upon the particular thematic map may result in poor control of the machine and may be impractical in many applications. Also, changing the machine settings to account for the instantaneous changes in the values in the thematic map can result in excessive changes that are impractical not feasible, result in poor machine performance, and/or can result in increased wear or deterioration of machine components.

One approach utilizes statistical clustering to assign a particular space on the worksite to a cluster. Thus, adjacent spaces are assigned to different clusters. These clusters often do not align well with the way in which the machine is being used. For instance, the clusters may not align with the machine path in a way that facilitates settings that achieve good machine performance. This too can result in poor performance and/or can result in increased wear or deterioration of the machine components.

In one example, the control system receives a thematic map and generates control signals based upon that thematic map, by clustering variable values mapped to different geographic locations on the worksite through a clustering algorithm. Some clustering methods are optimized for agronomic conditions. A purely statistical clustering mechanism can assign a particular space to a cluster, and then an adjacent space to a different cluster. Thus, even in such clustering methods, the control may be impractical as excessive changes to the input are resolved from frequent changes resulting from encountering control zones that do not align well to the way in which the machine is being utilized on the worksite.

Figure 3:
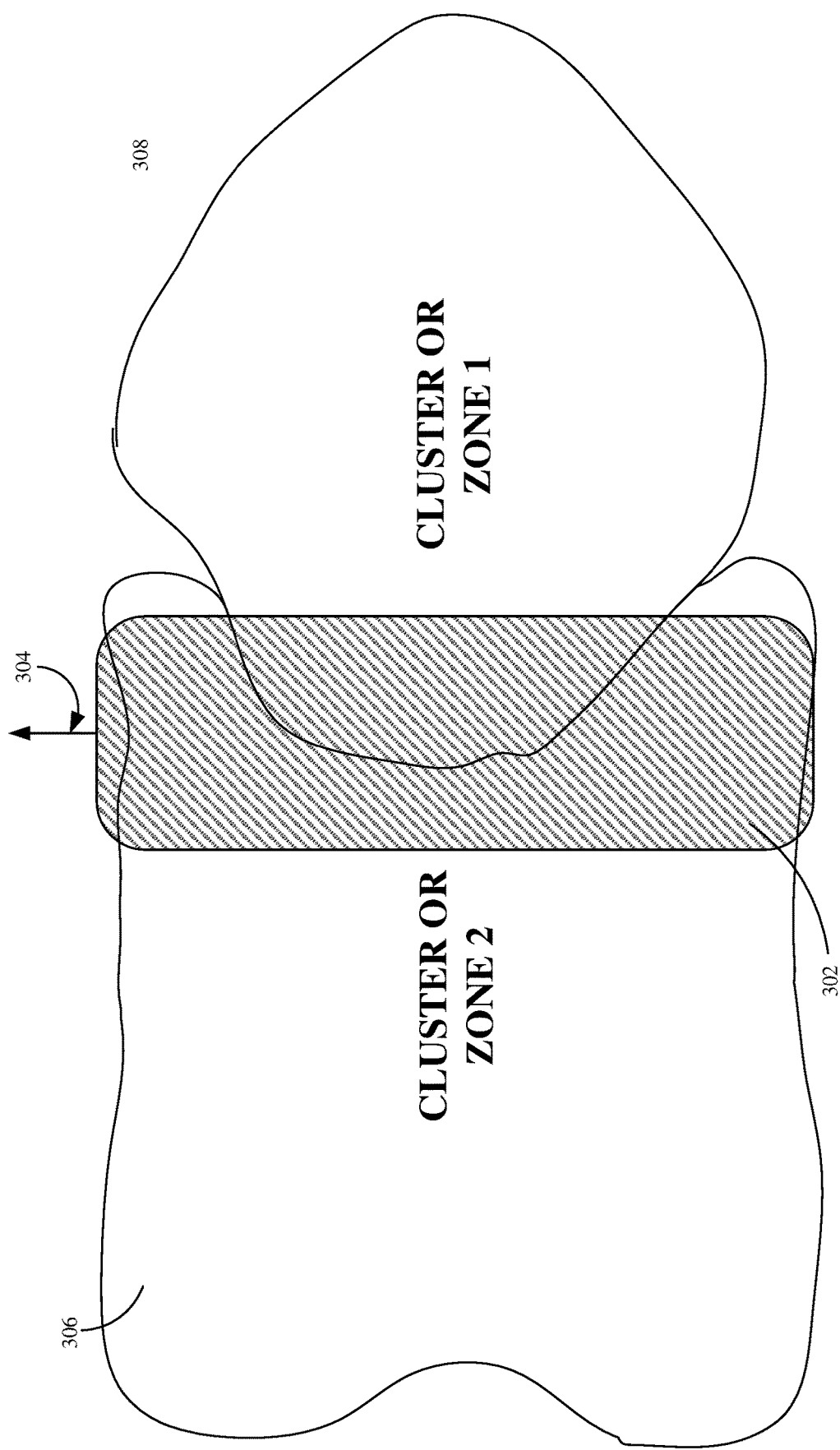
FIG. 3 is a schematic diagram illustrating a portion of a field with clusters relative to a machine path or swath.

To illustrate, FIG. 3 illustrates a scenario in which clusters are split inside a machine path or swath 302 as the machine travels in the direction represented by arrows 304. As the machine traverses path 302, the control system implements settings based on cluster or control zone 306. However, this can experience poor performance in the area of cluster or control zone 308. Alternatively, or in addition, the control zones 306/308 can result in the control system making frequent settings changes, which causes additional wear and tear on the machine.

Figure 4:
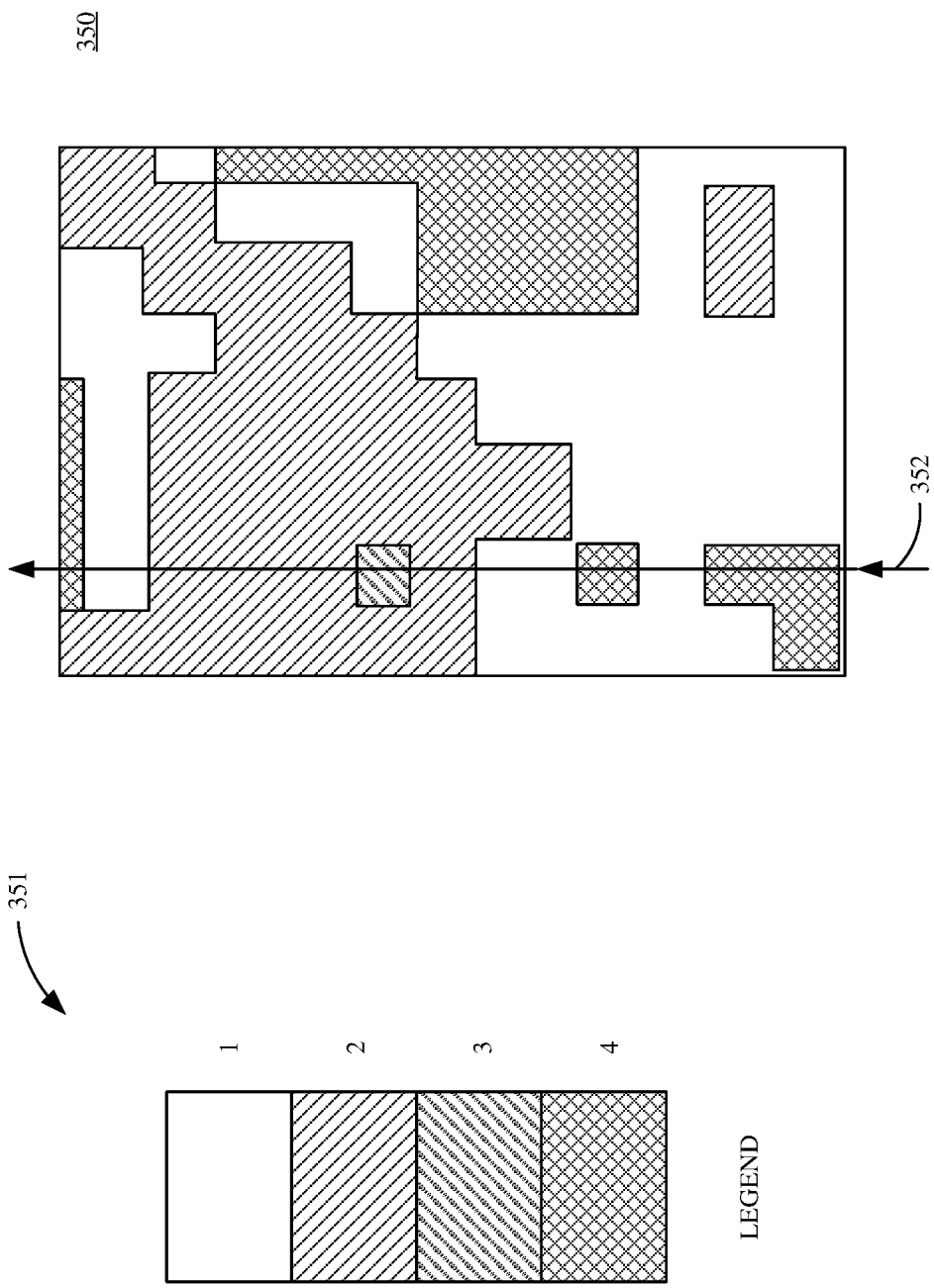
FIG. 4 illustrates an example clustering approach using k-means clustering.

FIG. 4 illustrates another example clustering approach using k-means clustering. Using an example k-means clustering approach, the points are hard assigned to one of the clusters, that is each data point is determined to belong to one specific cluster. This results in numerous areas of the field having frequent changes in cluster assignment. To illustrate, FIG. 4 shows a target or projected path 352 of a machine on a field 350. FIG. 4 also shows a legend 351 which illustrates that variable values on the map of field 350 have been clustered into four different value ranges, which are represented by values ranges 1-4 in legend 351. Thus, the variable values have been divided or clustered into four different value ranges based on a criterion (e.g., decile ranges, equal ranges between the low and high values, etc.). As the machine makes a pass over path 352 through field 350, it encounters a number of transitions between clusters 1-4. At each of the cluster boundaries, changes to the machine settings are made based on corresponding control settings. These numerous changes can result in poor machine performance and/or significant wear or deterioration of the machine components.

Referring again to FIG. 2, cluster generation system 242 generates clusters for control zone identification utilizing or enforcing geospatial control zone constraints. Thus, control system 218 can optimize machine settings across the field within a set of (one or more) control zone constraints. As discussed in further detail below, these constraints can take any of a variety of different forms. For sake of illustration, a geospatial work zone constraint defines a minimum distance on the field that a control zone can span. In one particular example, but not by limitation, a control zone constraint defines that the minimum control zone distance, and thus the minimum cluster size, is a quarter mile. Using these example control zones, control system 218 would ensure that the machine 100 travels at least a quarter mile before successive changes to the machine actuator(s) 212.

Figure 5:
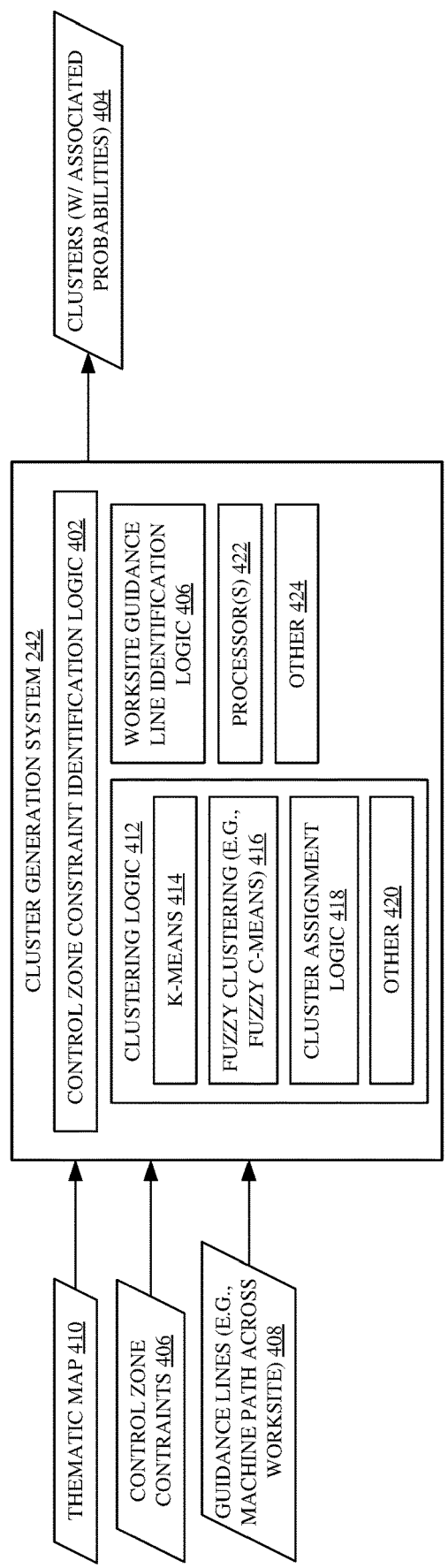
FIG. 5 is a block diagram of one example of a cluster generation system.

FIG. 5 illustrates one example of cluster generation system 242. Cluster generation system 242 includes control zone constraint identification logic 402 configured to identify one or more control zone constraints to be applied when generating clusters 404. The control zone constraints can be dynamically generated by system 242, for example based on detected operation of machine 100. In the illustrated example, control zone constraints 406 are received by system 242. For example, they can be input by operator 224 and/or received from a remote system. The control zone constraints can be associated with the worksite and stored in data store 216.

System 242 also includes worksite guidance line identification logic 407. For sake of illustration, but not by limitation, a worksite guidance line represents a target or projected machine path or route to be taken across the subject field. For instance, the machine path data 256 can be stored in data store 216 for the given field. The guidance lines are received by system 242, as represented by block 408. Of course, the worksite guidance lines can be dynamically identified by system 242 during operation of machine 100.

Cluster generation system 242 illustratively receives a thematic map or other geo-referenced a priori data. This can include one or more maps based on the particular work machine actuator(s) 212 to be controlled. The maps can represent different values or attributes that are referenced to different geographic locations in the field. The particular attributes reflected may differ, based upon the particular work machine actuator(s) 212 that are to be controlled based on that map.

Thematic map 410 can be generated based on priori data. It can also be generated or modified on-board work machine 100 from a priori data and/or in situ data generated from sensors 206. The thematic map 410 can be received in a wide variety of other ways as well.

Clustering logic 412 receives the thematic map 410 and applies a clustering algorithm to generate clusters 404. Any of a wide variety of different types of clustering algorithms can be utilized. For instance, clustering logic can include k-means clustering 414, fuzzy clustering 416 (e.g., fuzzy C-means), to name a few. Clustering logic 412 also includes cluster assignment logic 418 configured to assign points or regions of the thematic map 410 to particular clusters. Logic 412 can include other items 420 as well. Cluster generation system 242 is also illustrated as including one or more processors 422, and can include other items 424 as well.

In examples discussed in further detail below, fuzzy C-means clustering is utilized to generate clusters 404 with associated probabilities. Briefly, however, fuzzy clustering includes a form of clustering in which each data point can belong to more than one cluster. This clustering involves assigning data points to the clusters, such that items in the same cluster are as similar as possible (or at least have a threshold similarity) while items belonging to different clusters are as dissimilar as possible (or at least have a threshold dissimilarity). Clusters are identified using similarity measures, which can include distance, connectivity, intensity, etc. The different similarity measures can be chosen based on the data or the application.

Figure 6:
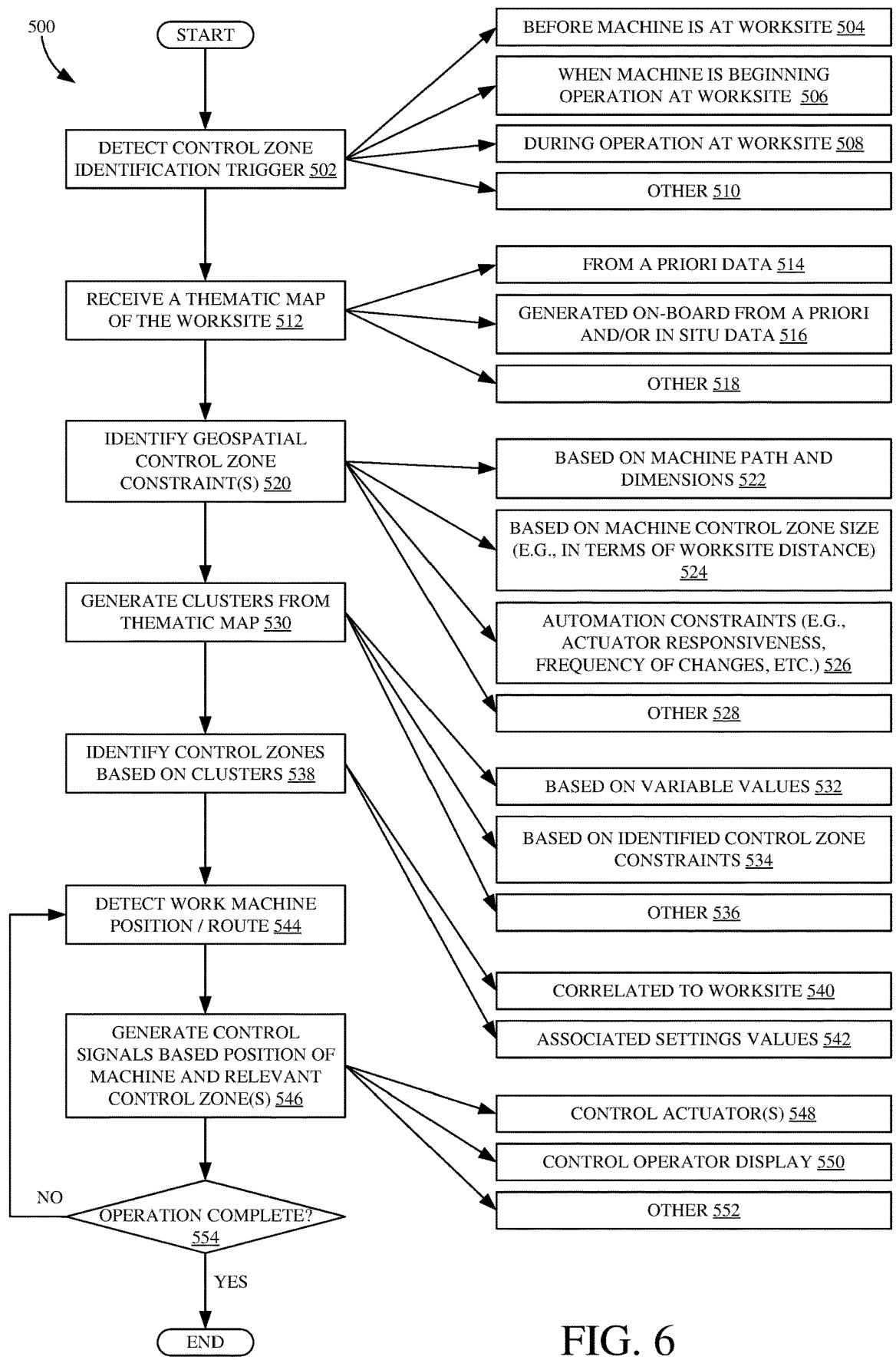
FIG. 6 is a flow diagram illustrating one example of operation of a control system in controlling a work machine using control zones.

FIG. 6 is a flow diagram 500 illustrating one example of operation of a control system in controlling a work machine using control zones. For sake of illustration, but not by limitation, FIG. 6 will be described in the context of cluster generation system 242 shown in FIG. 2.

At block 502, a control zone identification trigger is detected, indicating that control zones and settings are to be generated or evaluated. The trigger can be detected at any of a variety of times relative to the machine operation. The trigger can take a wide variety of different forms. For instance, control zone identification can be triggered before the machine is at the worksite (block 504), when the machine is beginning operation at the worksite (block 506), during operation at the worksite (block 508), or otherwise (block 510). In one example, control zone identification is triggered and performed before the machine enters the field operation, and/or can be updated during the operation. At block 512, a thematic map or other geo-referenced a priori data is received. As noted above, the thematic map can take a wide variety of different forms. For instance, it can comprise a yield map indicating expected yields at different areas of a field to be harvested by a combine.

Accordingly, the thematic map can be generated from a priori data. This is represented by block 514. Also, the thematic map can be generated on-board machine 100, from a priori data and/or in situ data. This is represented by block 516. Of course, the thematic map can be generated and received in other ways as well. This is represented by block 518.

The thematic map, in the present example, maps values of a variable to different geographic locations at a worksite. For instance, the thematic map maps values representing agronomic conditions to locations on the field. In one example, the map maps yield values to particular areas of a field. In one example, a thematic map maps NDVI data to particular areas of the field. In one example, values representing topology of the field are mapped.

At block 520, control zone constraint identification logic 402 identifies one or more control zone constraints. In the illustrated example, the constraints comprise geospatial constraints that are based on the machine path to be taken by a machine 100 and/or the dimensions of machine 100 (such as the width of header 102 in the case of a combine harvester). This is represented by block 522.

Alternatively, or in addition, the geospatial control zone constraints can be based on a minimum control zone size. This is represented by block 524. As discussed above, a minimum control zone size can be defined in terms of a minimum worksite distance for each cluster generated from the thematic map received at block 512. For instance, the minimum control zone size can define a minimum field distance of one quarter mile.

Also, the control zone constraints can indicate automation constraints, such as actuator responsiveness relative to the machine traversing the machine path, a frequency of changes of the actuators, etc. This is represented by block 526. Of course, the geospatial control zone constraints can comprise other types of constraints as well. This is represented by block 528.

At block 530, clustering logic 412 generates clusters from the thematic map based on the variable values in the map. This is represented by block 532. Also, the clusters are generated based on the identified control zone constraints, identified at block 520. This is represented by block 534. Of course, the clusters can be generated in other ways as well. This is represented by block 536.

At block 538, control zones are identified based on the clusters. This includes correlating the control zones to the corresponding areas of the worksite (block 540) and defining associated setting values for those control zones (block 542). For instance, the setting values at block 542 can be based on actuator setting limits, rate of change limits, or responsiveness, or otherwise. In one example, settings value identifier logic 246 identifies a single actuator setting for a corresponding control zone, or it can identify multiple different setting values that may be based upon different criteria. For instance, it may generate a first setting value if machine 100 is traveling at a first speed, and it may select a second setting value if machine 100 is traveling at a second speed.

Once the control zones and corresponding setting values have been identified, they are utilized by control signal generator logic 252 to control the work machine actuator(s) 212 based upon the control zones and setting values. In one example, at block 544, position/route identifier logic 248 detects the current geographic position and route of work machine 100. For instance, it can do this by detecting the position from position sensor 226 and the heading or orientation or pose of machine 100 from route sensor 230. It can also detect the speed of machine 100 from speed sensor 228. Of course, it can detect the work machine position and route in a wide variety of other ways as well.

At block 546, control zone accessing logic 250 accesses the relevant control zones (zones that machine 100 is in or is about to cross into), and setting value adjustment logic 246 identifies the magnitude and direction of adjustments (if any) for the different work machine actuator(s) 212 based upon that information. Control signal generator logic 252 generates the control signals, at the appropriate time, so that the new setting values will be reached when, or shortly after, work machine 100 crosses into a new control zone. Control of the actuators is represented by block 548.

Alternatively, or in addition, control signal generator logic 252 can control a display device or other operator interface mechanism to display an indication of the setting value adjustments. This is represented by block 550. Of course, the control signals can be generated in other ways as well. This is represented by block 552.

At block 554, control system 218 determines whether the work machine operation is complete. If not, control system 218 continues to detect the position of machine 100 and determines whether machine 100 is approaching a new control zone, upon which the corresponding control signals are generated and used to control machine 100. Also, it is noted that during operation, the process can return to block 502 to reevaluate and/or re-determine the control zones, for example based on in situ data collected by machine 100 during operation.

Figure 7:
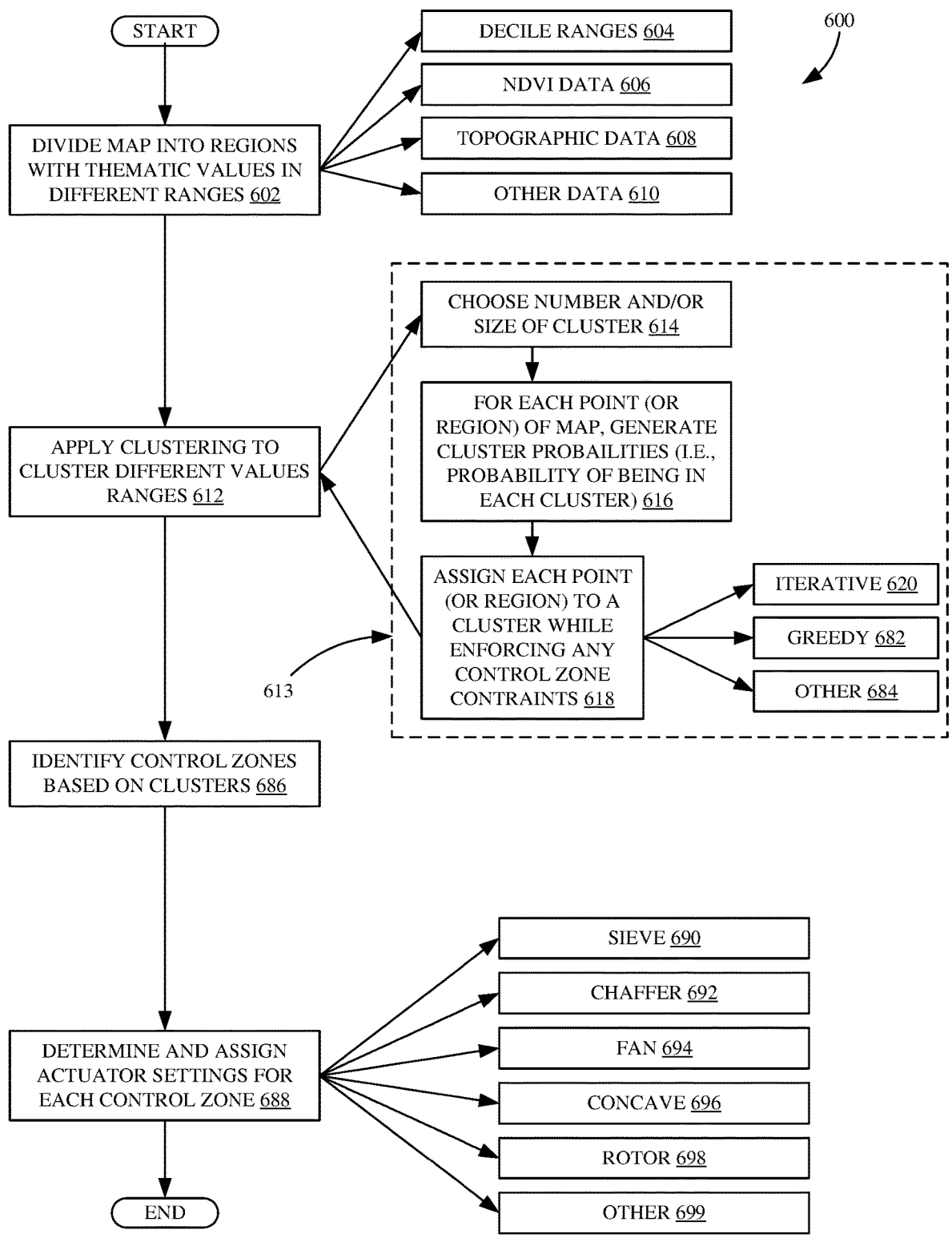
FIG. 7 is a flow diagram illustrating one example of generating clusters from a thematic map and identifying control zones based on the clusters.

FIG. 7 is a flow diagram 600 illustrating one example of generating clusters from a thematic map and identifying control zones based on those clusters. For sake of illustration, but not by limitation, FIG. 7 will be illustrated in the context of cluster generation system 242 illustrated in FIG. 2.

At block 602, a thematic map (or other a priori data geo-referenced to a worksite) is divided into regions with thematic values in different ranges. For instance, the thematic map received at block 512 is processed at block 602 to identify points or regions in the map with corresponding variable values.

Accordingly, the map can map variables such a topology, soil type, vegetation index data, vegetation type (such as species, variety, etc.) and/or a wide variety of other variables to the geographic location. Clustering logic 412 divides that map into regions of thematic values (the variables or parameters that are mapped) where each region represents a set of thematic values (the parameters or variables mapped) in different ranges. This is represented by block 604.

One example of the data can be normalized difference vegetation index (NDVI) data. This is represented by block 606. In another example, the data can represent topographic position index data that indicates whether the areas of the field are flat, are sloped (e.g., are on a hill), or indicate other topographical characteristics of the worksite. This is represented by block 608. Of course, the map can be divided based on other data as well. This is represented by block 610.

Clustering logic 412 then applies a clustering mechanism to cluster the different value ranges identified at block 606. By way of example, the clustering algorithm can convert the map of variables into crop property estimates, such as yield, biomass, moisture, protein, oil, starch, etc. Also, the clustering mechanism can be any of a wide variety of different types of clustering mechanisms, such as k-means clustering, etc.

In the illustrated example, clustering logic 412 applies fuzzy clustering 416. This is represented by block 613 in FIG. 7. In the illustrated example, block 613 includes selecting a number and/or size of clusters to be generated from the map. This is represented by block 614. The number and/or size of clusters can be selected in any of a number of ways. For instance, the number of clusters can be based on the number of values identified from the map at block 602. Accordingly, if the map indicates a wide range of variable values, a large number of clusters can be selected. Alternatively, if the variable values are relatively small, a small number of clusters can be selected at block 614.

At block 616, for each point (or region) on the map, cluster probabilities are generated. The cluster probabilities indicate a probability of the point (or region) being in each of the clusters, chosen at block 614. An example may be helpful.

Figure 8:
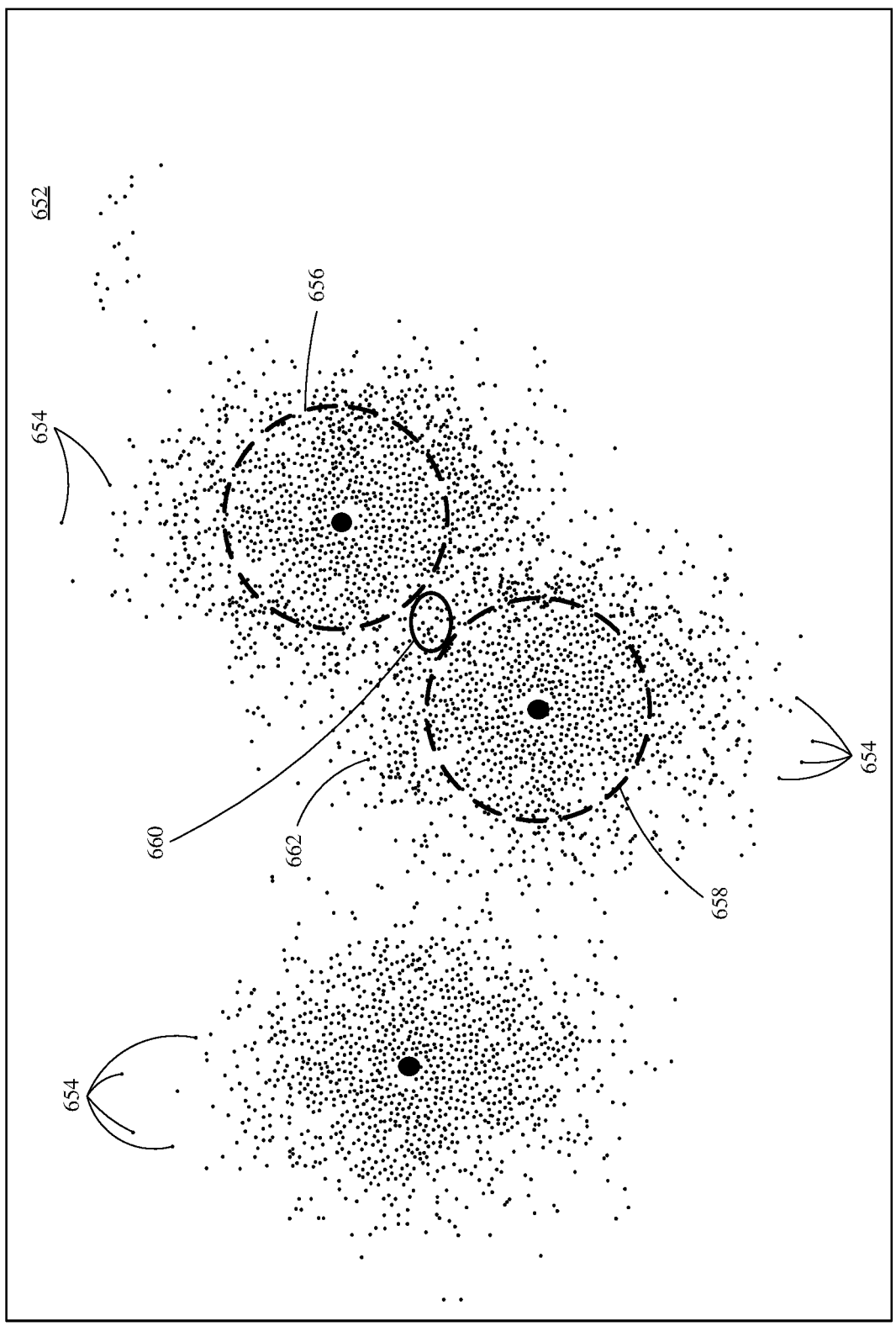
FIG. 8 illustrates a portion of an example map of a field.

FIG. 8 illustrates a portion of a map 650 of a field 652, in one example. In map 650, each point 654 is assigned NDVI data (or other data representing agronomic conditions, topology conditions, etc.). The map be color-coded or otherwise coded to depict locations in field 652 with NDVI values in different ranges (such as different decile ranges). As described above, crop data other than NDVI data that is well correlated to the crop attribute of interest can be used.

Accordingly, each point 654 in map 650 maps a variable value (e.g., NDVI values) to a particular location of field 652. In this example, a region 656 of points, referred to as cluster one, is identified as having a high probability of being in a first cluster and a second region 658 of points, referred to as cluster two", is identified as having a second or next highest probability of being in a second cluster. A region 660 of clusters that resides between regions 656 and 658 could thus be in either cluster one or cluster two. Thus, the points in region 660 are each assigned a corresponding probability of being in cluster one and a probability of being in cluster two. For sake of illustration, in one particular example, a point 662 could be assigned a sixty percent probability of being in cluster one and a forty probability of being in cluster two. This, of course, is for sake of example only.

Referring again to FIG. 7, at block 618, each point (or region) of the map is assigned to a cluster while enforcing any identified control zone constraints (e.g., the constraints identified at block 520 in FIG. 6). In one example, the points are assigned to the cluster iteratively. This is represented by block 620. One example of iterative assignment of points to clusters is illustrated with respect to FIG. 9.

Figure 9:
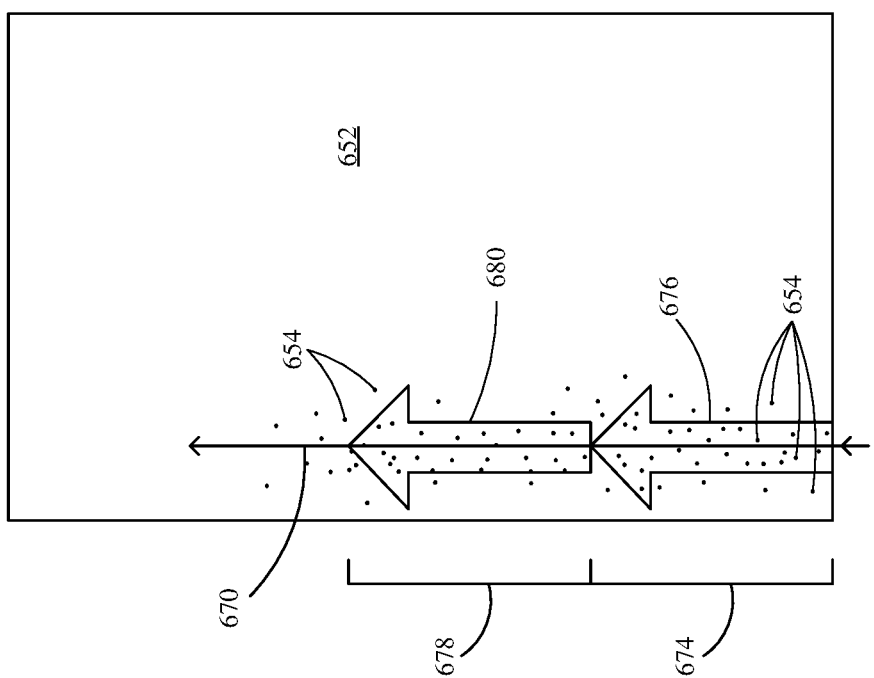
FIG. 9 illustrates one example of iterative assignment of points in a field to clusters.

As illustrated in FIG. 9, a guidance line or path 670 is identified across field 652. Here, a quarter mile control zone constraint is utilized, for sake of example only. In the iterative assignment of FIG. 9, for the first quarter mile 674 on path 670 across field 652, the highest probability cluster (cluster one in the illustrated example) is selected based on the probabilities of the points 654 that reside in that corresponding portion of field 652. This cluster is represented by arrow 676. The iterative process then proceeds to the next quarter mile 678, and selects the highest probability cluster, for that quarter mile, based on the probabilities of the points 654 that reside in that corresponding portion of field 652. This cluster is represented by arrow 680.

Figure 10:
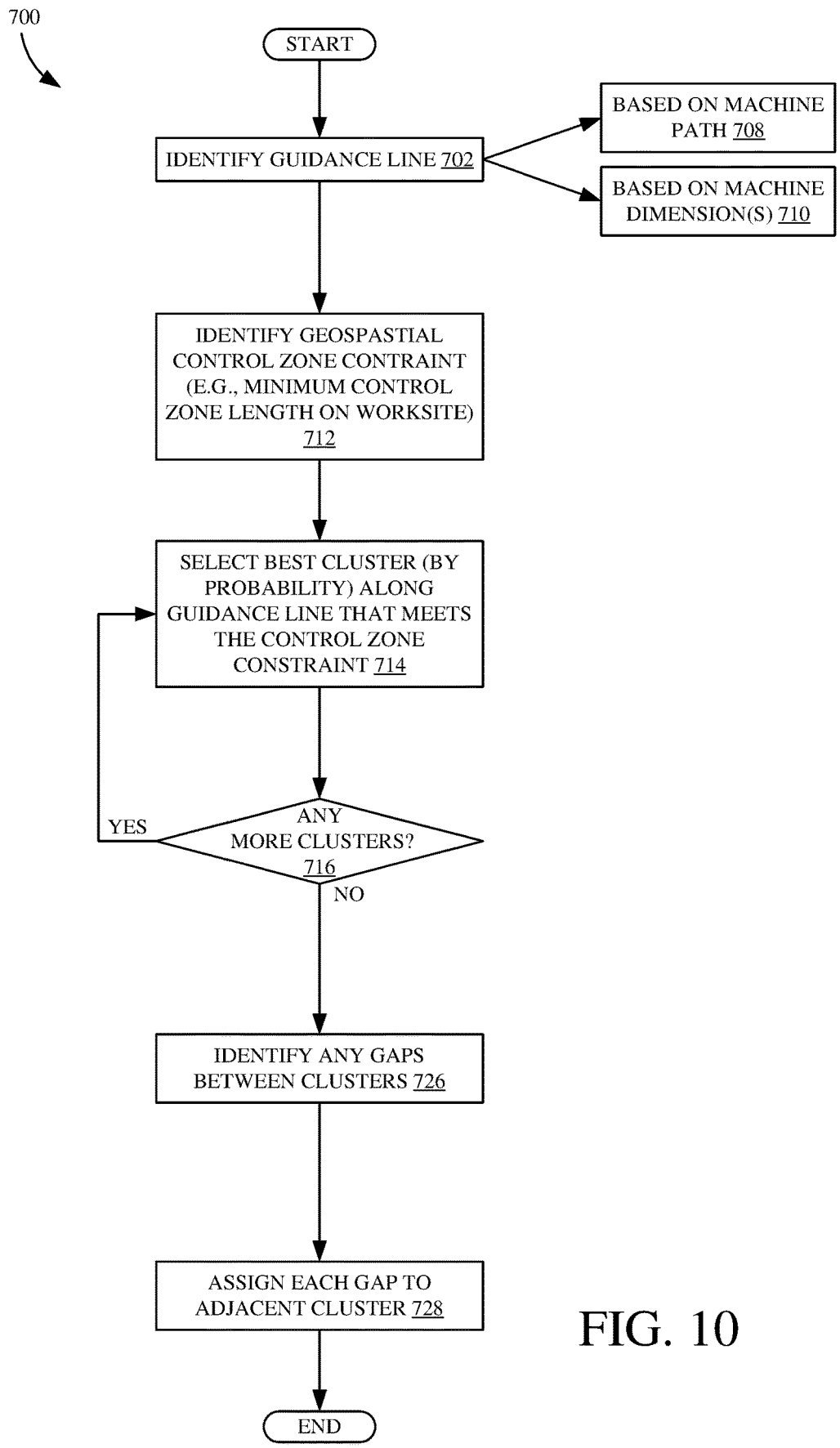
FIG. 10 is a flow diagram of one example of greedy cluster assignment.

Referring again to FIG. 7, in another example, greedy assignment of points to clusters can be utilized, as represented by block 682. FIG. 10 is a flow diagram 700 illustrating one example of greedy assignment performed at block 682. FIG. 10 will be described in conjunction with FIG. 11.

At block 702, a guidance line or path 704 is identified on field 652. The guidance line 704 represents the target or projected machine path. This is represented at block 708. In addition, the guidance line 704 can be identified based on the machine dimension(s) (e.g., a width of header 102). This is represented by block 710.

At block 712, one or more geospatial control zone constraints are identified. In the illustrated example, a geospatial control zone constraint identified at block 712 represents a minimum control zone length on field 652. For instance, a quarter mile control zone constraint is utilized so that machine setting adjustments are not made in less than quarter mile increments.

At block 714, based on the cluster probabilities assigned to points 654, a first cluster, that meets the control zone constraint(s), is identified along line 704 based on the cluster probabilities associated with the points. In the illustrated example, this includes selecting the quarter mile represented at reference numeral 718, as it meets the control zone constraint and contains the points having a best (e.g., highest) probability of being in a particular cluster (cluster one, which is represented by arrow 720 in the present example).

At block 716, the process determines whether there are any additional clusters to be selected. Here, the process returns to block 714, a second cluster is selected along the guidance line, based on the cluster probabilities assigned to these points (e.g., the contain points with the second highest cluster probability). In the illustrated example, a second quarter mile (represented by reference numeral 722) is selected having points indicating that they are contained in a second cluster (represented by arrow 724, referred to as "cluster two"). The process continues back to block 716, where it is determined whether there are any additional clusters that meet the control zone constraint(s).

Figure 11:
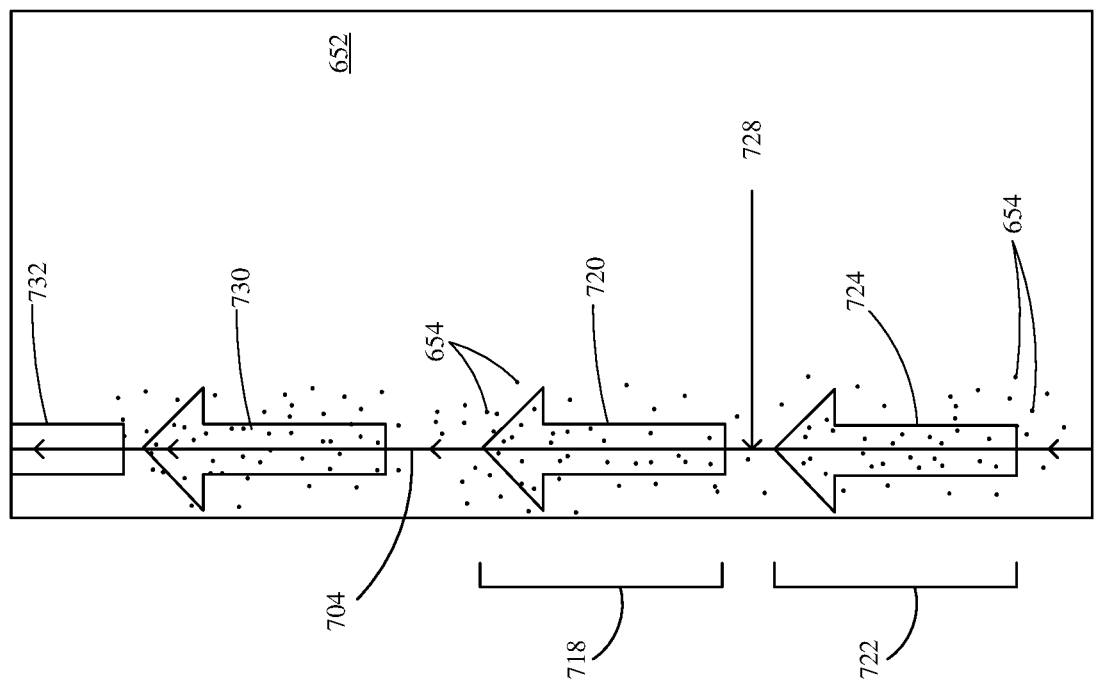
FIG. 11 illustrates one example of greedy assignment of points in a field to clusters.

Once all these clusters have been identified, the process proceeds to block 726, where any gaps between the clusters are identified. As illustrated in FIG. 11, a gap 728 exists between cluster one 720 and cluster two 724. Here, the points 654 in the gap 728 (or a portion of them) are assigned to one of the adjacent clusters (cluster one or cluster two) based on the probabilities associated with those points 654 on the map.

Illustratively, the operation shown in FIG. 10 forms clusters that meet the spatial control zone constraints so that small clusters (i.e., less than the quarter mile constraint in the above example) are avoided. That is, the minimum length of a given cluster along the machine path is a quarter mile, if not more. This avoids the machine encountering small control zones that would result in frequent machine setting changes which can result in poor performance and/or machine wear or degradation.

Figure 12:
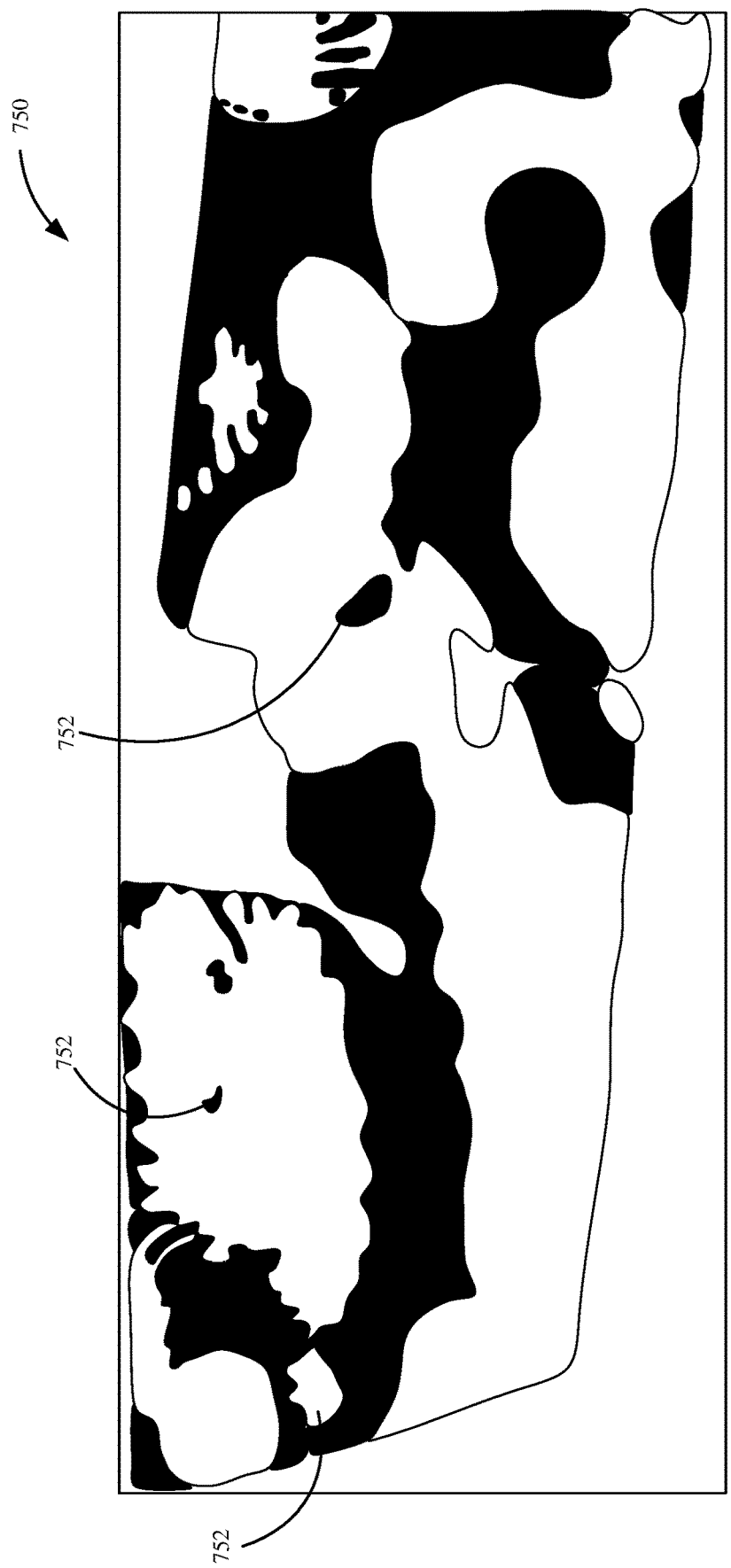
FIG. 12 illustrates one example of a thematic map clustered using a k-means clustering algorithm.

To illustrated, FIG. 12 illustrates one example of a thematic map 750 that has been clustered using k-means clustering. Here, a number of short segments or regions (e.g., identified by reference numerals 752) are formed by the clustering algorithm. When control zones are assigned to those clusters, they result in relatively small areas of control, with frequent setting changes.

Figure 13:
FIG. 13 illustrates the thematic map of FIG. 12, clustered using a fuzzy clustering algorithm, in one example.

Conversely, FIG. 13 illustrates clustering performed on the same thematic map with fuzzy C-means or other similar fuzzy clustering algorithms. Here, it will be seen that the clusters have been smoothed by enforcing spatial control zone constraints, which reduces the number of control zone changes.

Referring again to FIG. 7, at block 618, the points can be assigned to clusters in other ways as well. This is represented by block 684.

Once the points on the map have been clustered at block 612, the process proceeds to block 686 where control zones are identified based on the clusters. In the example of FIG. 11, a first control zone is identified at cluster 720 (an including gap 728) and a second control zone is identified at cluster 724. At block 788, actuator settings are determined and assigned for each of the control zones identified at block 686.

As an example, with reference to FIG. 11, assume the control zones identified at block 686 are based on clusters generated from points 654, for a combine harvester. Here, path 704 has been divided into control zones 720, 724, etc. Further, assume that the corresponding clusters, to which those control zones were assigned, represent different yields of zero to ten bushels per acre (for control zone 720), eleven to twenty bushels per acre (for control zone 724), etc. In that case, for the identified control zones, the sieve actuator 284 in work machine 100 can be actuated so that the bottom sieve values are assigned to the control zones as shown in Table 1 below.

TABLE 1

| Control Zones(s) | Bottom Sieve Setting |
| --- | --- |
| Zone 1 (720) | 6.0 |
| Zone 2 (724) | 8.0 |
| Zone 3 (not shown in FIG. 11) | 6.5 |
| Zone 4 (not shown in FIG. 11) | 7.0 |
| Zone 5 (not shown in FIG. 11) | 7.5 |
| Zone 6 (not shown in FIG. 11) | 8.0 |

The control zones identified for chaffer actuator 286 can also have settings so that the chaffer actuator is actuated to make the top chaffer settings, for the zones shown in FIG. 11, as set out below in Table 2:

TABLE 2

| Control Zones(s) | Top Sieve Setting |
| --- | --- |
| Zone 1 (720) | 17.0 |
| Zone 2 (724) | 17.0 |
| Zone 3 (730) | 18.0 |
| Zone 4 (732) | 18.0 |
| Zone 5 (not shown in FIG. 11) | 19.0 |
| Zone 6 (not shown in FIG. 11) | 20.0 |

Various settings for the actuators on the combine can be varied linearly or otherwise. For instance, this includes settings for a sieve 690, a chaffer 692, a fan 694, a concave 696, a rotor 698, or other components 699 of the machine. The control zones can contain the corresponding machine settings for the actuators corresponding to components 690-699. In other examples, yield zones with yield data can be plugged into a mathematical formula, or a lookup table, to provide settings for that control zone.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 14:
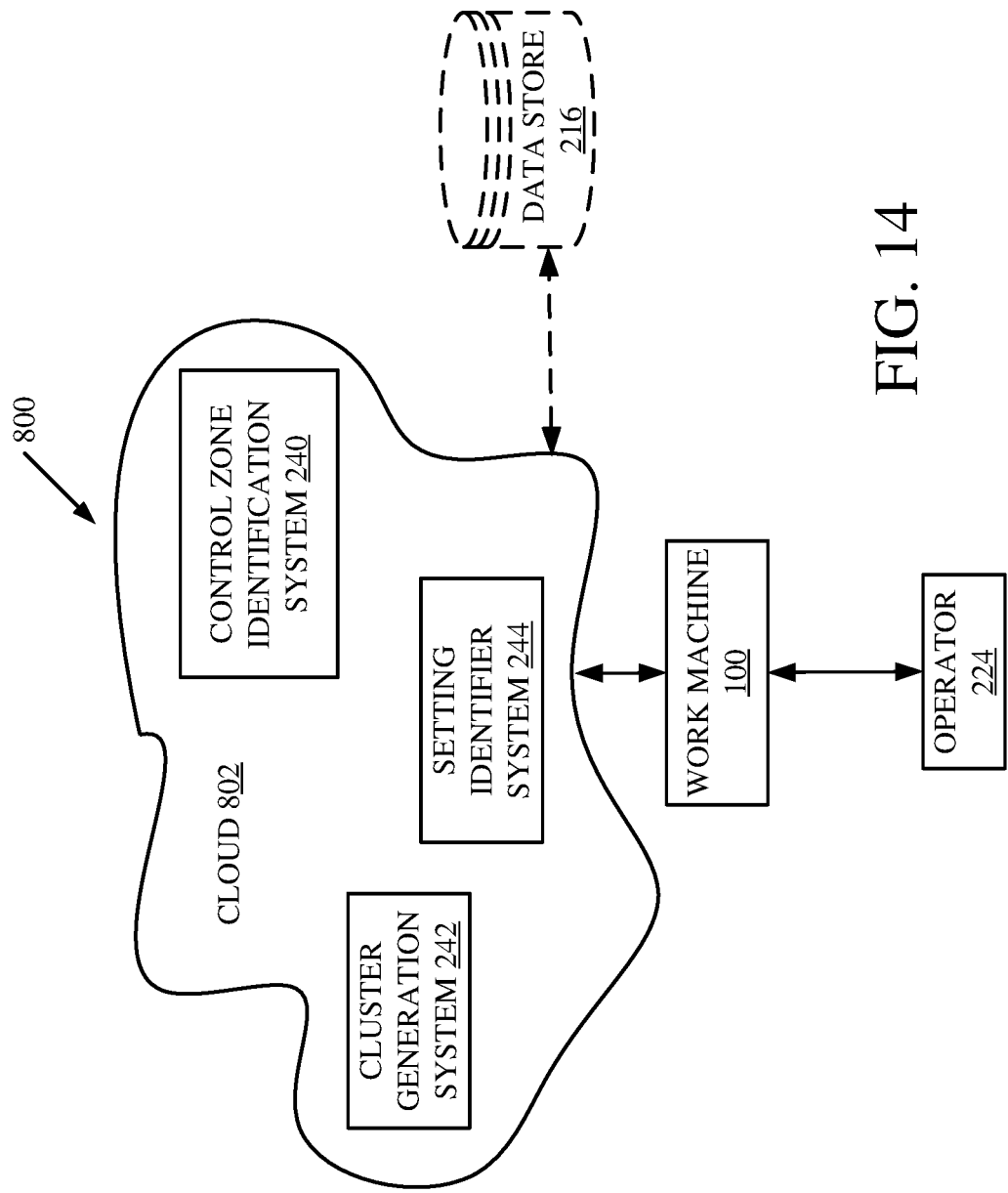
FIG. 14 is a block diagram showing one example of the architecture illustrated in FIG. 2, deployed in a remote server architecture.

FIG. 14 is a block diagram of one example of the work machine architecture shown in FIG. 2, where machine 100 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 14, some items are similar to those shown in FIG. 2 and they are similarly numbered. FIG. 14 shows that systems 240, 242, and/or 244 can be located at a remote server location 802. Therefore, machine 100 accesses those systems through remote server location 802.

FIG. 14 also depicts another example of a remote server architecture. FIG. 14 shows that it is also contemplated that some elements of FIG. 2 are disposed at remote server location 802 while others are not. By way of example, data store 216 can be disposed at a location separate from location 802, and accessed through the remote server at location 802. Regardless of where they are located, they can be accessed directly by machine 100, through a network (either a wide area network or a local area network), they can be hosted at a remote site by a service, or they can be provided as a service, or accessed by a connection service that resides in a remote location.

Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine comes close to the fuel truck for fueling, the system automatically collects the information from the harvester or transfers information to the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine until the machine enters a covered location. The machine, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
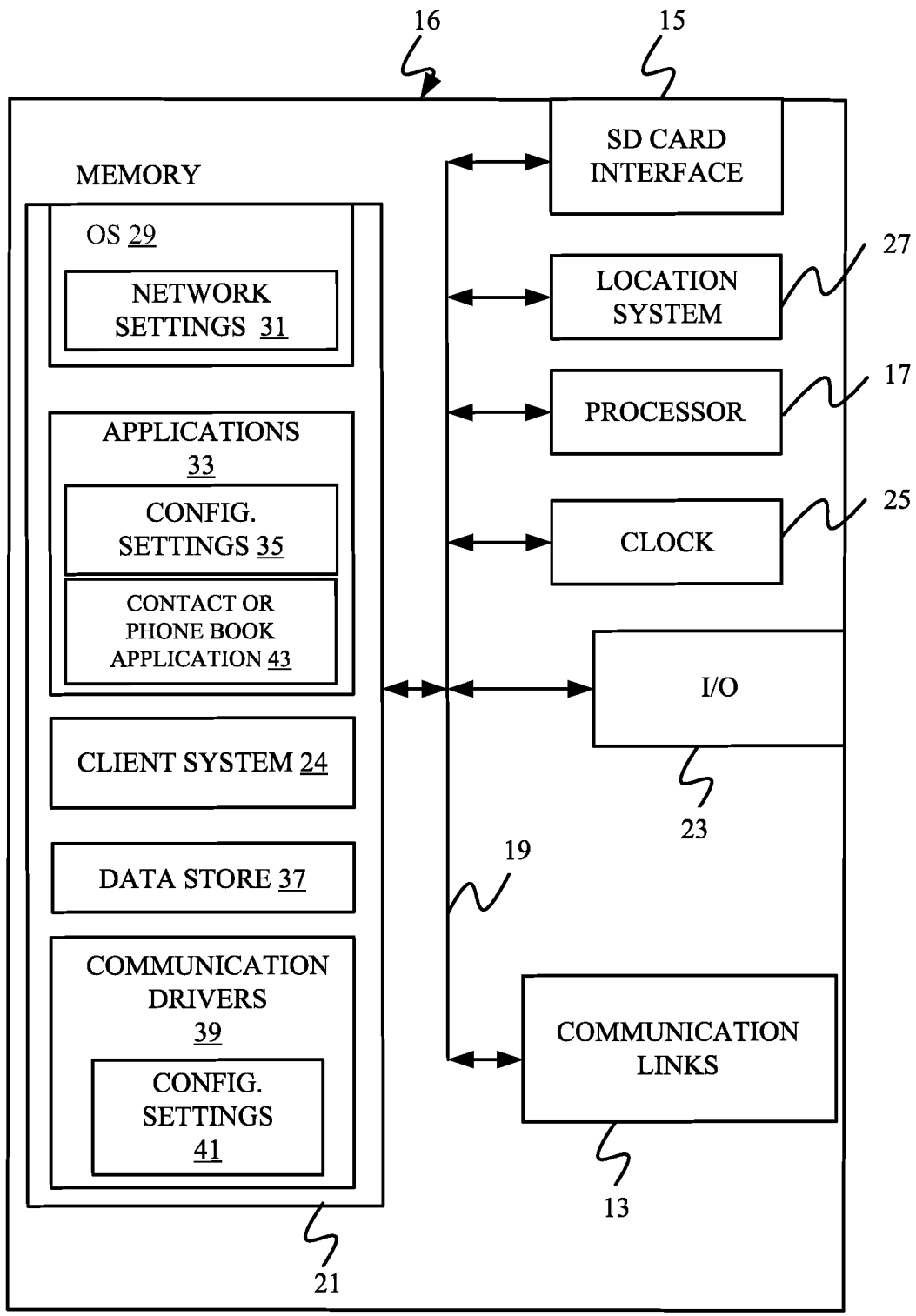
FIGS. 15-17 show examples of mobile devices that can be used in the architectures shown in previous FIGS.
Figure 16:
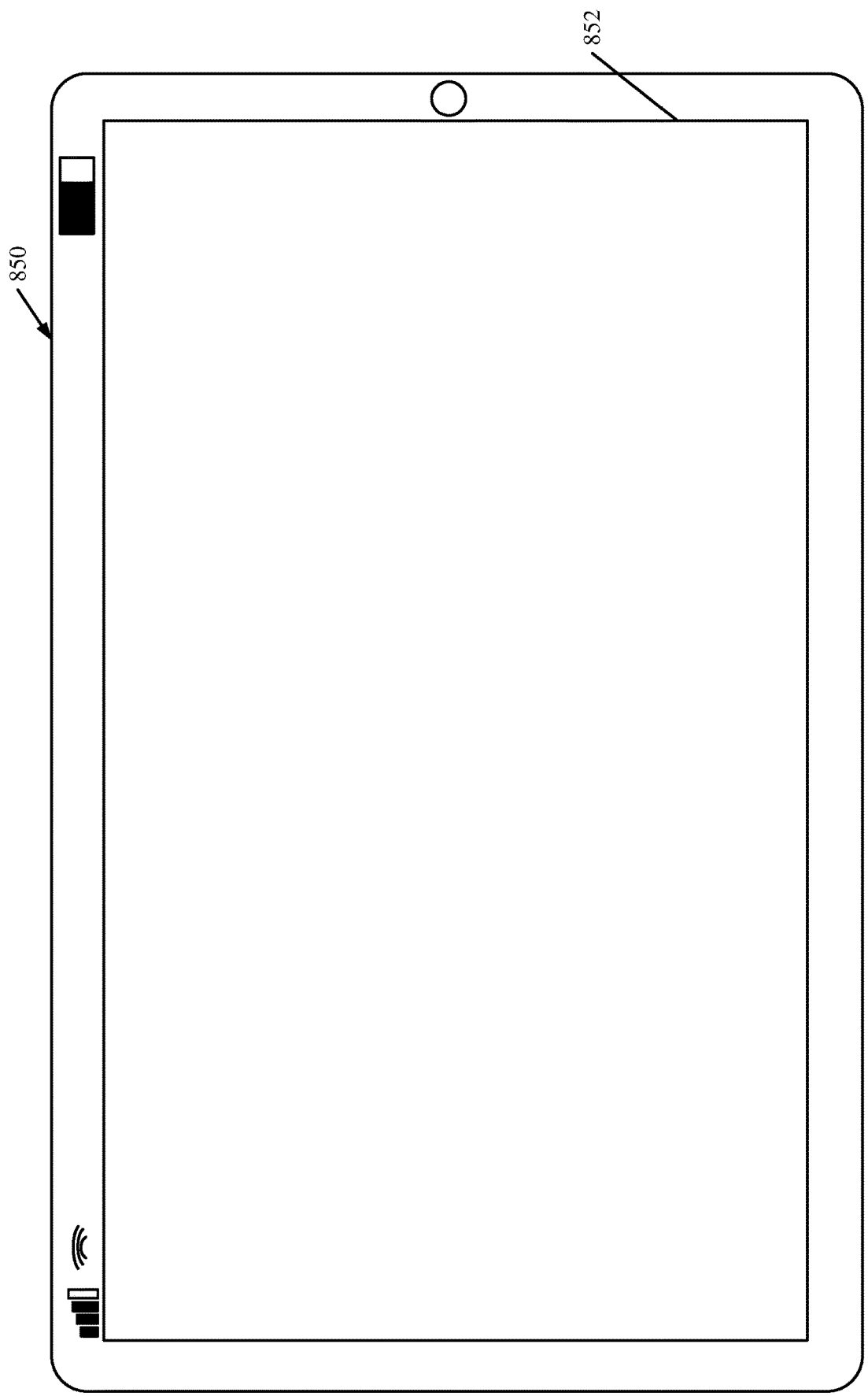
Figure 17:
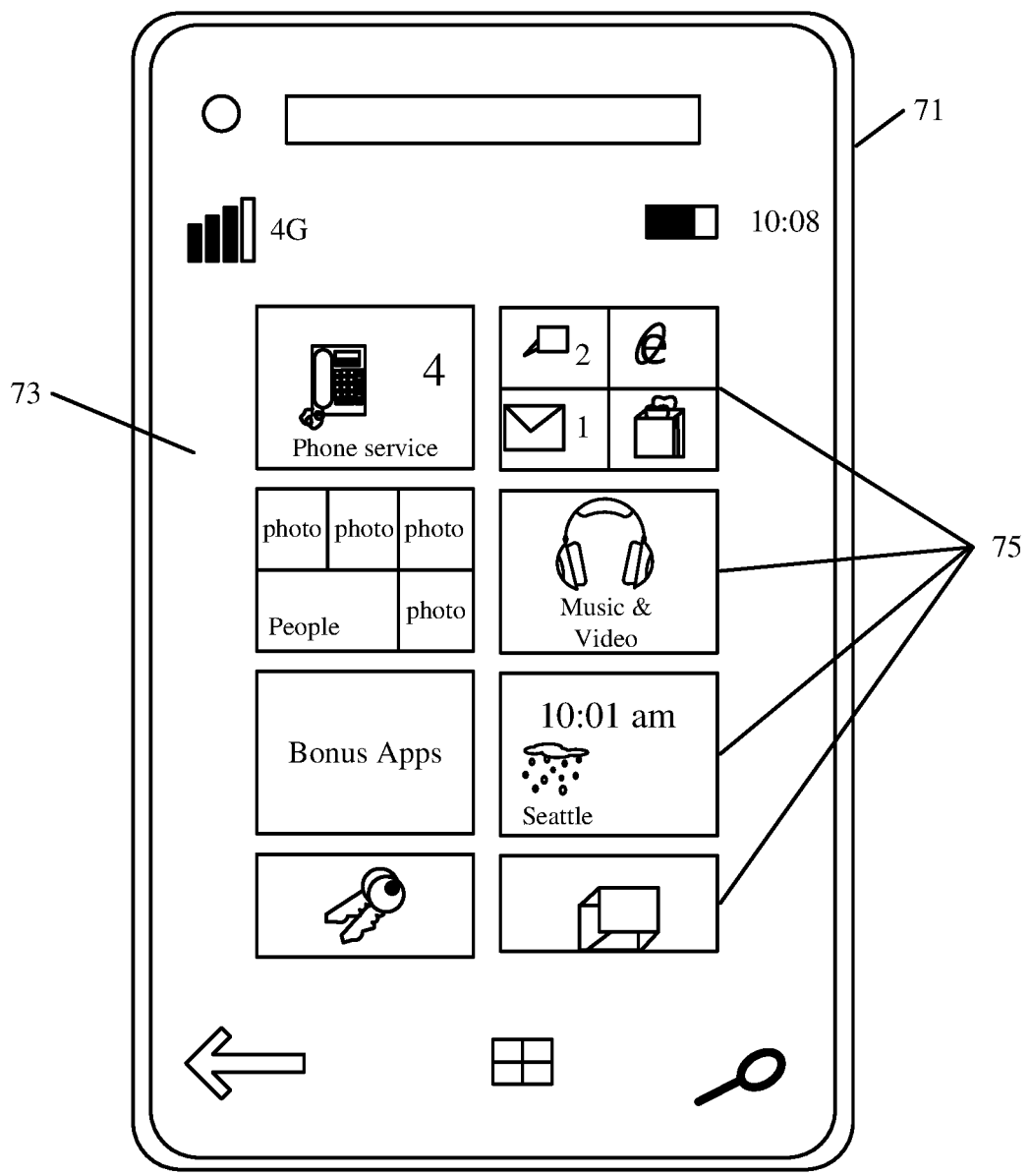

FIG. 15 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 100 for use in generating, processing, or displaying the settings data or map data or zone data. FIGS. 16-17 are examples of handheld or mobile devices.

FIG. 15 provides a general block diagram of the components of a client device 16 that can run some components shown in FIG. 2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 16 shows one example in which device 16 is a tablet computer 850. In FIG. 16, computer 850 is shown with user interface display screen 852. Screen 852 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also illustratively receive voice inputs as well.

FIG. 17 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 18:
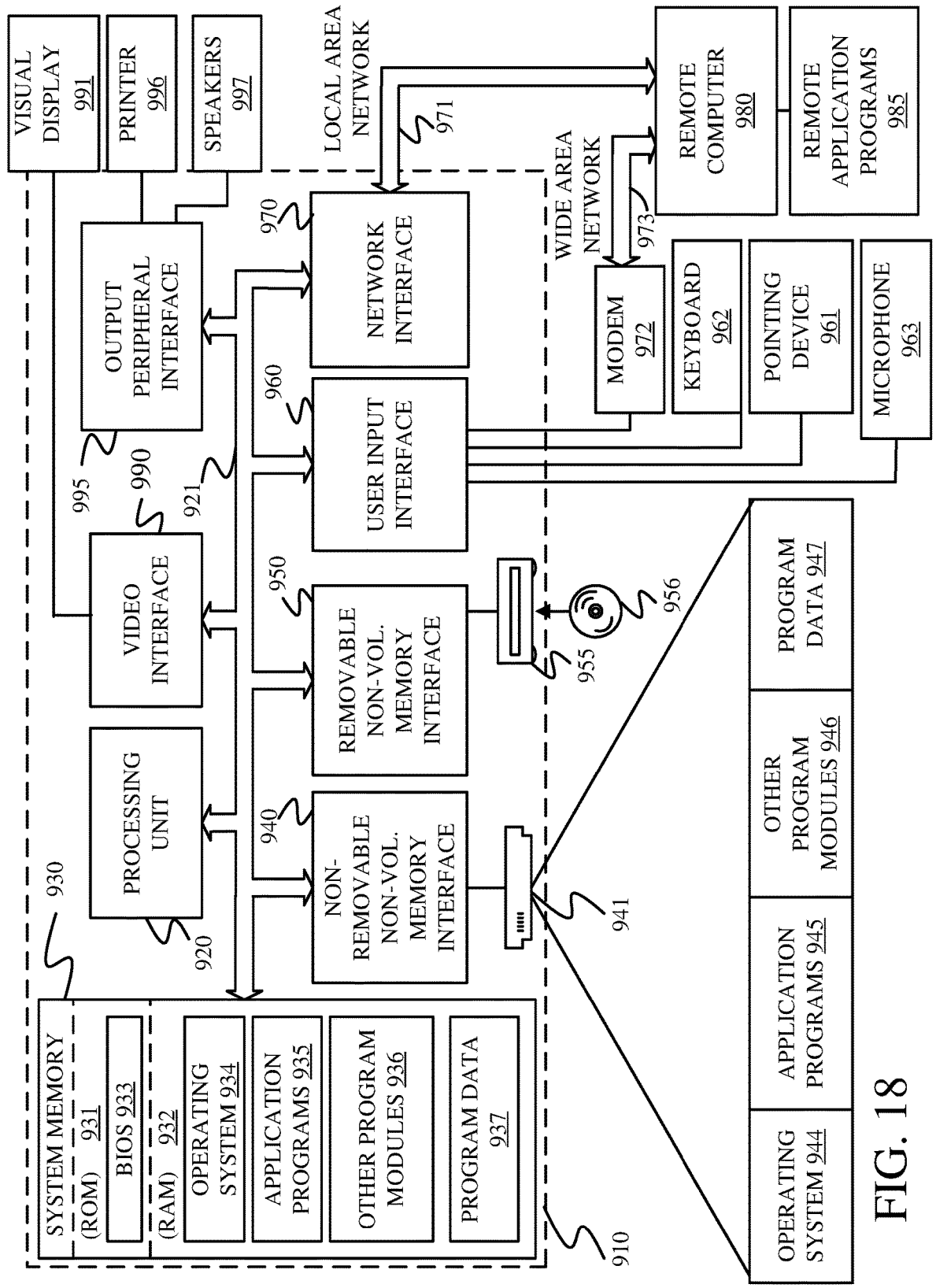
FIG. 18 is a block diagram showing one example of a computing environment that can be used in the architectures shown in previous examples.

FIG. 18 is one example of a computing environment in which elements of FIG. 2, or parts of it, (for example) can be deployed. With reference to FIG. 18, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 18.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 18 illustrates operating system 934, application programs 935, other program modules 936, and program data 937.

The computer 910 may also include other removable/non-removable volatile/nonvolatile computer storage media. By way of example only, FIG. 18 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 910. In FIG. 18, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 18 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a work machine comprising:
    a work machine actuator;
    a position sensor configured to sense a geographic position of the work machine on a worksite; and
    a control system configured to:
        receive an indication of a thematic map of the worksite that maps variable values to different geographic locations on the worksite;
        generate a set of clusters based on the variable values and a geospatial control zone constraint;
        identify, based on the set of clusters, a plurality of control zones that are correlated to the worksite and have associated setting values; and
        generate control signals to control the work machine actuator based on the geographic position of the work machine relative to the plurality of control zones and the setting values associated with the control zones.

Example 2 is the work machine of any or all previous examples, wherein the control system is configured to generate the set of clusters based on different value ranges.

Example 3 is the work machine of any or all previous examples wherein the variable values represent agronomic conditions.

Example 4 is the work machine of any or all previous examples, wherein the variable values represent normalized difference vegetation index (NDVI) data.

Example 5 is the work machine of any or all previous examples, wherein the variable values represent topography of the worksite.

Example 6 is the work machine of any or all previous examples, wherein the control system is configured to identify the plurality of control zones based on at least one of:
  responsiveness of the work machine actuator; or
  setting limits of the work machine actuator.

Example 7 is the work machine of any or all previous examples, wherein the geospatial control zone constraint is based on a target path of the work machine across the worksite.

Example 8 is the work machine of any or all previous examples, wherein the geospatial control zone constraint is based dimensions of the work machine.

Example 9 is the work machine of any or all previous examples, wherein the geospatial constraint represents a minimum control zone distance along the target path of the work machine.

Example 10 is the work machine of any or all previous examples wherein the control system is configured to:
  generate cluster probabilities for points on the thematic map based on the variable values corresponding to the points, wherein the cluster probabilities represent a probability of each point being in one of the clusters; and
  generate the set of clusters based on the cluster probabilities.

Example 11 is the work machine of any or all previous examples, wherein the control system is configured to generate the clusters by selecting a first cluster in a first region along a target machine path on the field based on the cluster probabilities of points in the first region.

Example 12 is the work machine of any or all previous examples, wherein the selecting the first cluster comprising identifying a region along the machine path having points with a highest probability of being in the first cluster, and further comprising selecting a second cluster in a second region along the machine path based on the cluster probabilities of points in the second region.

Example 13 is a computer-implemented method comprising:
  receiving position information indicating a geographic position of a work machine on a worksite;
  receiving indication of a thematic map of the worksite that maps variable values to different geographic locations on the worksite;
  generating a set of clusters based on the variable values and a geospatial control zone constraint;
  identifying, based on the set of clusters, a plurality of control zones that are correlated to the worksite and have associated setting values; and
  generating control signals to control the work machine based on the geographic position of the work machine relative to the plurality of control zones and the setting values associated with the control zones.

Example 14 is the method of any or all previous examples, wherein the variable values represent at least one of agronomic conditions and topography of the worksite, and wherein generating the set of clusters comprises:
  generating the set of clusters based on different value ranges.

Example 15 is the method of any or all previous examples, wherein the geospatial control zone constraint is based on a target path of the work machine across the worksite.

Example 16 is the method of any or all previous examples, wherein the geospatial control zone constraint is based dimensions of the work machine and represents a minimum control zone distance along the target path of the work machine.

Example 17 is the method of any or all previous examples, and further comprising:
  generating cluster probabilities for points on the thematic map based on the variable values corresponding to the points, wherein the cluster probabilities represent a probability of each point being in one of the clusters; and
  generating the set of clusters based on the cluster probabilities.

Example 18 is the method of any or all previous examples, wherein generating the set of clusters comprises:
  selecting a first cluster in a first region along a target machine path on the field based on the cluster probabilities of points in the first region, and
  selecting a second cluster in a second region along the machine path based on the cluster probabilities of points in the second region.

Example 19 is a work machine comprising:
  a work machine actuator;
  a position sensor configured to sense a geographic position of the work machine on a worksite; and
  a control system configured to:
    receive an indication of a thematic map of the worksite that maps variable values to different geographic locations on the worksite;
    generate cluster probabilities for points on the thematic map based on the variable values corresponding to the points, wherein the cluster probabilities represent a probability of each point being in one of a plurality of different clusters; and
    generate a set of clusters based on the cluster probabilities and a geospatial control zone constraint;
    identify, based on the set of clusters, a plurality of control zones that are correlated to the worksite and have associated setting values; and
    generate control signals to control the work machine actuator based on the geographic position of the work machine relative to the plurality of control zones and the setting values associated with the control zones.

Example 20 is the work machine of any or all previous examples, wherein the control system is configured to generate the set of clusters by
  selecting a first cluster in a first region along a target machine path on the field based on the cluster probabilities of points in the first region, and
  selecting a second cluster in a second region along the machine path based on the cluster probabilities of points in the second region.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A work machine comprising:
a work machine actuator;
a position sensor configured to sense a geographic position of the work machine on a worksite; and
a control system configured to:
receive an indication of a thematic map that includes a set of points, wherein each point, of the set of points, represents a respective geographic location on the worksite and includes a variable value that is mapped to the respective geographic location;
receive a control zone input that identifies a geospatial control zone constraint separate from the thematic map;
generate a set of clusters based on the thematic map, wherein each particular cluster in the set of clusters includes a subset of the points assigned to the particular cluster based on:
the variable values of the subset of the points, and
the geospatial control zone constraint;
identify, based on the set of clusters, a plurality of control zones, wherein each control zone, of the plurality of control zones, is correlated to the worksite and includes an associated setting value; and
generate control signals to control the work machine actuator based on the geographic position of the work machine relative to the plurality of control zones and the associated setting values of the plurality of control zones.

2. The work machine of claim 1, wherein the control system is configured to generate the set of clusters based on different value ranges.

3. The work machine of claim 1, wherein the variable values represent agronomic conditions.

4. The work machine of claim 3, wherein the variable values represent normalized difference vegetation index (NDVI) data.

5. The work machine of claim 1, wherein the variable values represent topography of the worksite.

6. The work machine of claim 1, wherein the geospatial control zone constraint represents at least one of:
responsiveness of the work machine actuator; or
setting limits of the work machine actuator.

7. The work machine of claim 1, wherein the geospatial control zone constraint is based on a target machine path for traversal of the work machine across the worksite.

8. The work machine of claim 7, wherein the geospatial control zone constraint represents one or more of:
a dimension of the work machine; or
a minimum control zone distance along the target machine path of the work machine.

9. The work machine of claim 1, wherein the control zone input comprises a user input that defines the geospatial control zone constraint.

10. The work machine of claim 1, wherein the control system is configured to:
generate cluster probabilities for the points on the thematic map based on the variable values corresponding to the points, wherein the cluster probabilities represent a probability of each point being in one of the clusters; and
generate the set of clusters based on the cluster probabilities.

11. The work machine of claim 10, wherein the control system is configured to generate the clusters by selecting a first cluster in a first region along a target machine path on the worksite based on the cluster probabilities of points in the first region.

12. The work machine of claim 11, wherein the selecting the first cluster comprising identifying a region along the target machine path having points with a highest probability of being in the first cluster, and further comprising selecting a second cluster in a second region along the target machine path based on the cluster probabilities of points in the second region.

13. A computer-implemented method comprising:
receiving position information indicating a geographic position of a work machine on a worksite;
receiving an indication of a thematic map of the worksite that maps variable values to different geographic locations on the worksite;
receiving a control zone input that identifies a geospatial control zone constraint separate from the thematic map;
generating a set of clusters based on the variable values and the geospatial control zone constraint;
identifying, based on the set of clusters, a plurality of control zones that are correlated to the worksite and have associated setting values; and
generating control signals to control the work machine based on the geographic position of the work machine relative to the plurality of control zones and the associated setting values associated with the control zones.

14. The computer-implemented method of claim 13, wherein the variable values represent at least one of agronomic conditions and topography of the worksite, and wherein generating the set of clusters comprises:
generating the set of clusters based on different value ranges.

15. The computer-implemented method of claim 13, wherein the geospatial control zone constraint is based on a target path of the work machine across the worksite.

16. The computer-implemented method of claim 15, wherein the geospatial control zone constraint is based dimensions of the work machine and represents a minimum control zone distance along the target path of the work machine.

17. The computer-implemented method of claim 13, and further comprising:
generating cluster probabilities for points on the thematic map based on the variable values corresponding to the points, wherein the cluster probabilities represent a probability of each point being in one of the clusters; and
generating the set of clusters based on the cluster probabilities.

18. The computer-implemented method of claim 17, wherein generating the set of clusters comprises:
selecting a first cluster in a first region along a target machine path on the worksite based on the cluster probabilities of points in the first region, and
selecting a second cluster in a second region along the target machine path based on the cluster probabilities of points in the second region.

* * * * *